(12) United States Patent
Ying et al.

(10) Patent No.: US 12,513,722 B2
(45) Date of Patent: Dec. 30, 2025

(54) DETERMINISTIC TRANSMISSION METHOD, COMMUNICATION APPARATUS, AND STORAGE MEDIUM

(71) Applicant: HUAWEI TECHNOLOGIES CO., LTD., Guangdong (CN)

(72) Inventors: Jiangwei Ying, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 18/164,290

(22) Filed: Feb. 3, 2023

(65) Prior Publication Data

US 2023/0189309 A1 Jun. 15, 2023

Related U.S. Application Data

(63) Continuation of application No. PCT/CN2021/098743, filed on Jun. 7, 2021.

(30) Foreign Application Priority Data

Aug. 4, 2020 (CN) .......................... 202010774757.1

(51) Int. Cl.
*H04W 72/51* (2023.01)
*H04W 72/12* (2023.01)
(Continued)

(52) U.S. Cl.
CPC ........... *H04W 72/51* (2023.01); *H04W 72/12* (2013.01); *H04W 72/542* (2023.01); *H04W 72/56* (2023.01); *H04W 76/20* (2018.02)

(58) Field of Classification Search
None
See application file for complete search history.

(56) References Cited

U.S. PATENT DOCUMENTS

| 12,074,809 B2* | 8/2024 | Pocovi .................... H04L 49/90 |
| 2020/0267785 A1* | 8/2020 | Talebi Fard ............ H04L 45/04 |

(Continued)

FOREIGN PATENT DOCUMENTS

| CN | 110876159 A | 3/2020 |
| WO | 2019166081 A1 | 9/2019 |

(Continued)

OTHER PUBLICATIONS

Nokia, Nokia Shanghai Bell, TSN—QoS Framework. SA WG2 Meeting #128-Bis, Aug. 20-24, 2018, Sophia Antipolis, S2-188101, 6 pages.

(Continued)

*Primary Examiner* — Anh Vu H Ly
(74) *Attorney, Agent, or Firm* — WOMBLE BOND DICKINSON (US) LLP

(57) ABSTRACT

This application discloses a deterministic transmission method, a communication apparatus, and a storage medium, and relates to the communication field. In the method, a radio access network device may generate deterministic transmission capability information of a first switching node, and send the deterministic transmission capability information to a first network element. The first switching node includes the radio access network device and a terminal. Then, the radio access network device may receive a first scheduling policy that is delivered by the first network element based on the deterministic transmission capability information of the first switching node, so that deterministic transmission can be performed according to the first scheduling policy. This reduces a delay variation of a QoS flow carrying a TSN flow in a 5GS, and can avoid a need to select a QoS flow whose delay indicator is excessively high for the TSN flow.

18 Claims, 28 Drawing Sheets

(51) Int. Cl.
*H04W 72/542* (2023.01)
*H04W 72/56* (2023.01)
*H04W 76/20* (2018.01)

(56) References Cited

U.S. PATENT DOCUMENTS

| | | | |
|---|---|---|---|
| 2021/0105192 A1* | 4/2021 | Kahn | H04L 41/5009 |
| 2022/0022088 A1* | 1/2022 | Gebert | H04L 43/0858 |
| 2022/0078662 A1* | 3/2022 | Wang | H04M 15/66 |
| 2023/0019215 A1* | 1/2023 | Wang | H04L 47/24 |

FOREIGN PATENT DOCUMENTS

| | | |
|---|---|---|
| WO | 2020036911 A1 | 2/2020 |
| WO | 2020104946 A1 | 5/2020 |
| WO | 2020150333 A1 | 7/2020 |

OTHER PUBLICATIONS

3GPP TS 23.501 V16.5.1 (Aug. 2020), 3rd Generation Partnership Project; Technical Specification Group Services and System Aspects; System architecture for the 5G System (5GS); Stage 2(Release 16), 440 pages.
IEEE Std 802.1Qcc—2018, IEEE Standard for Local and Metropolitan Area Networks Bridges and Bridged Networks, Amendment 31: Stream Reservation Protocol (SRP) Enhancements and Performance Improvements. 208 pages.
3GPP TSG-SA WG2 Meeting #130,S2-1900590,Discussion on system enhancement for TSN logical bridge management,Huawei, HiSilicon,Kochi, India, Jan. 21 Jan. 25, 2019,total 4 pages.

* cited by examiner

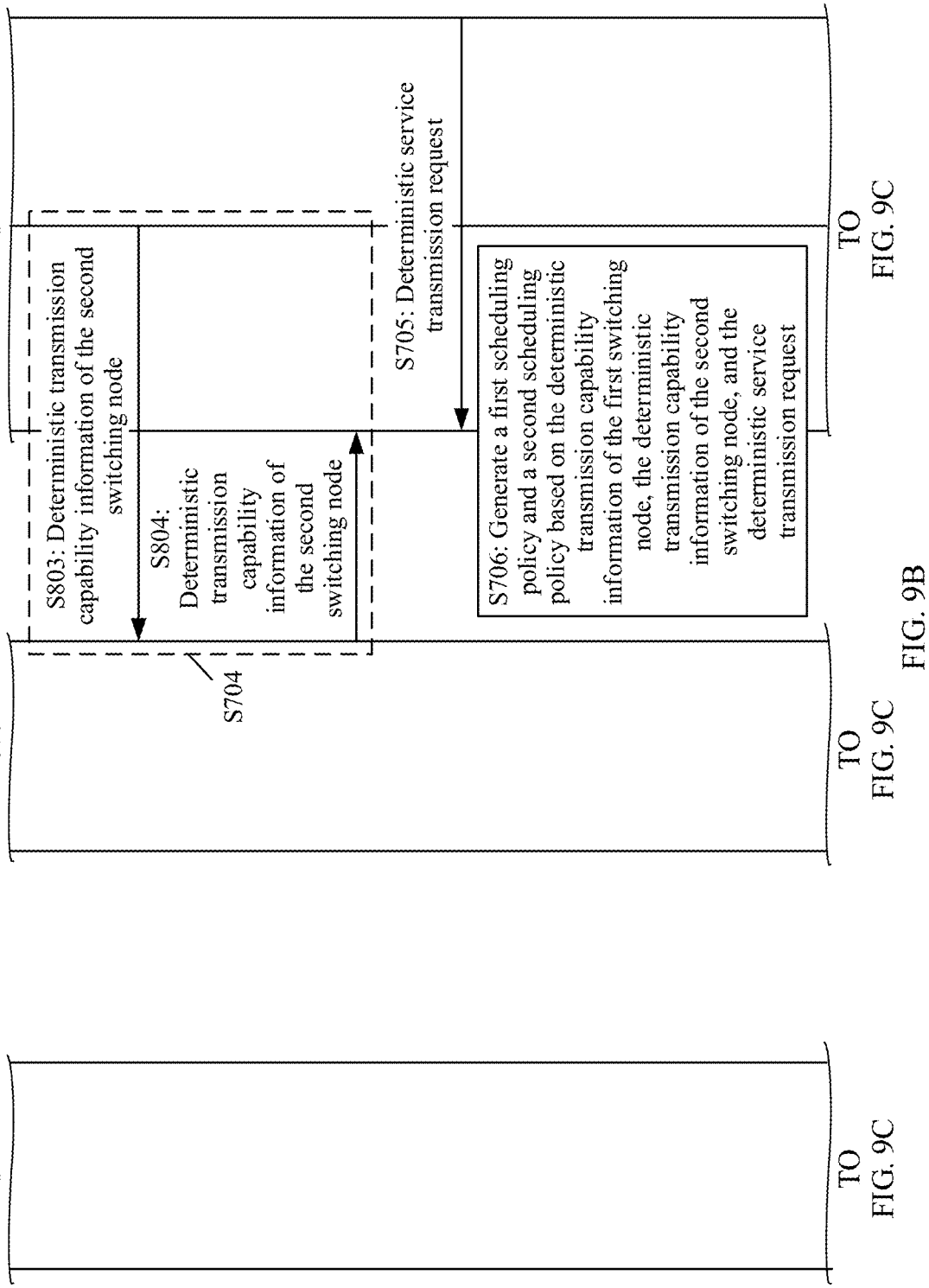

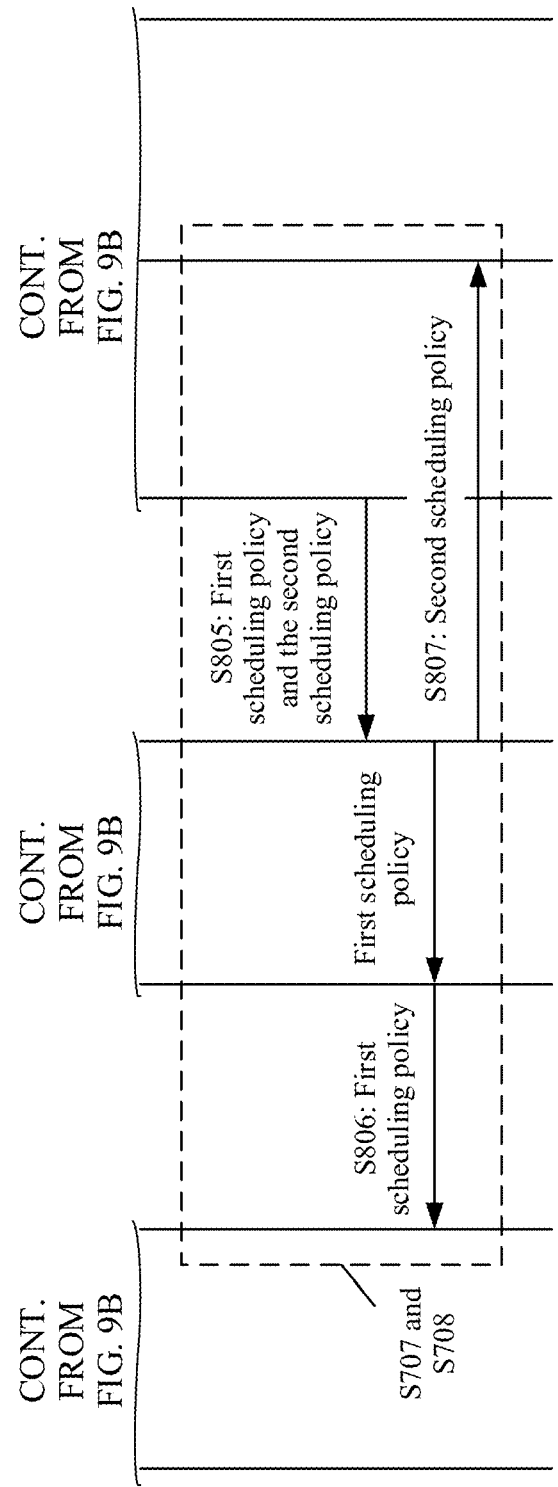

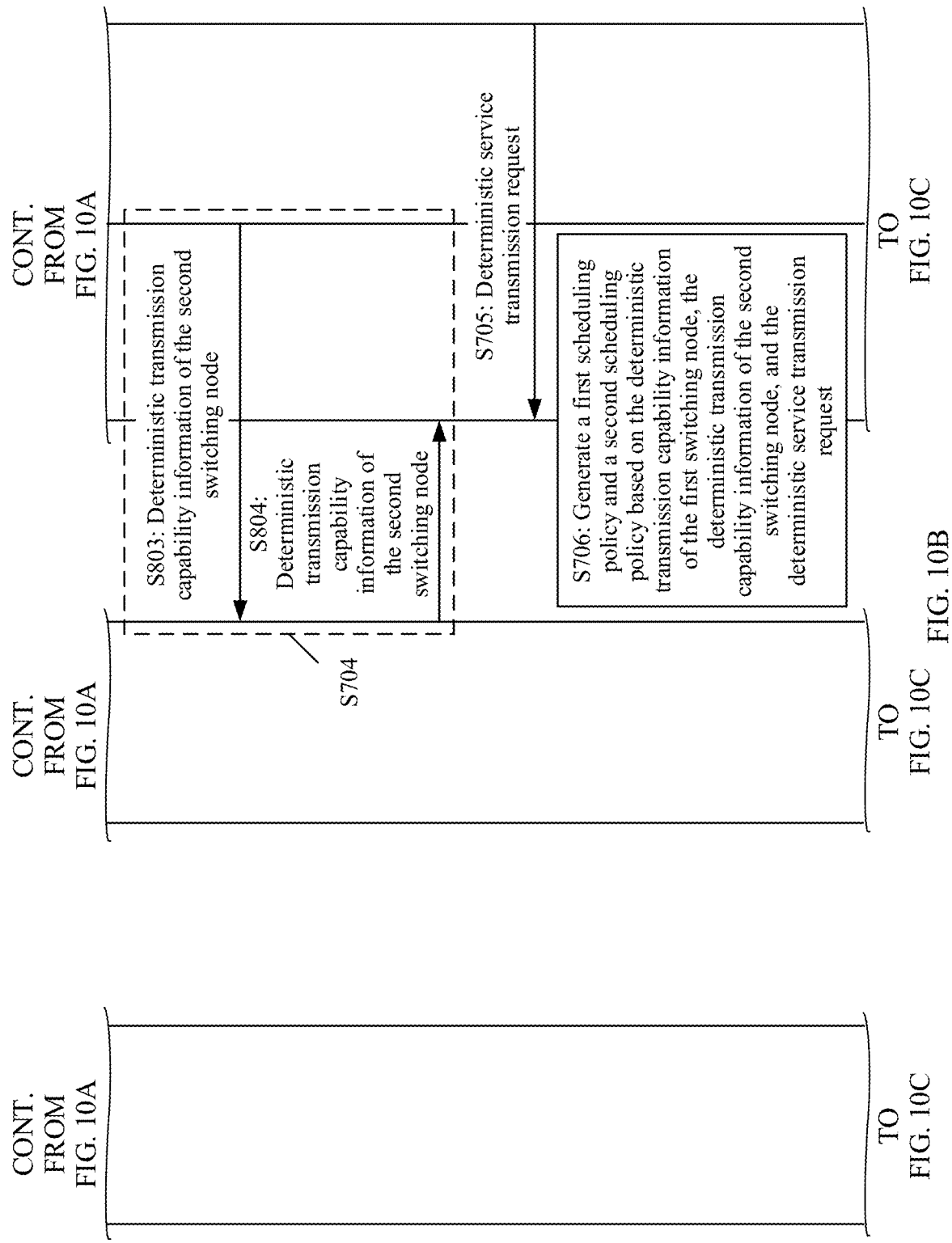

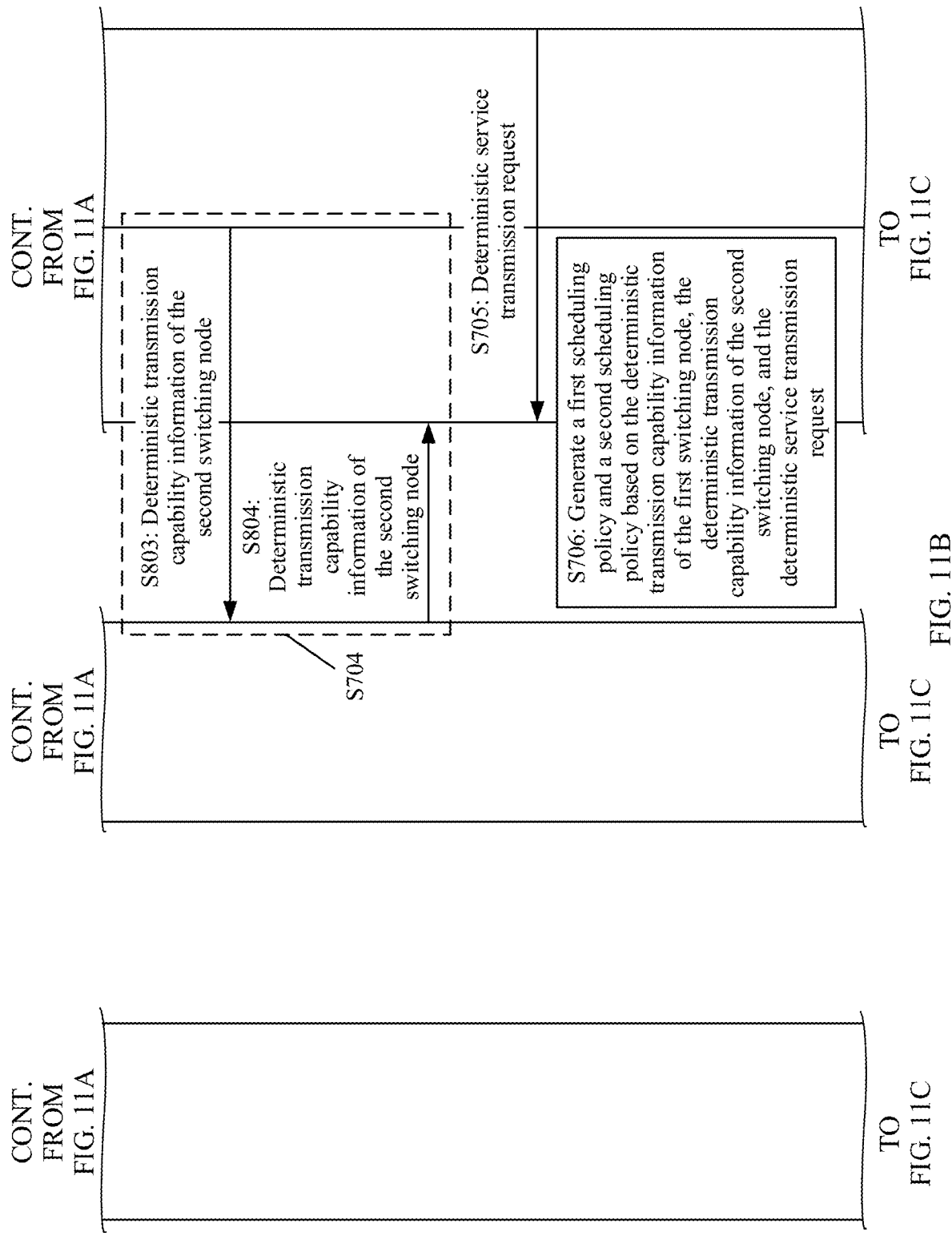

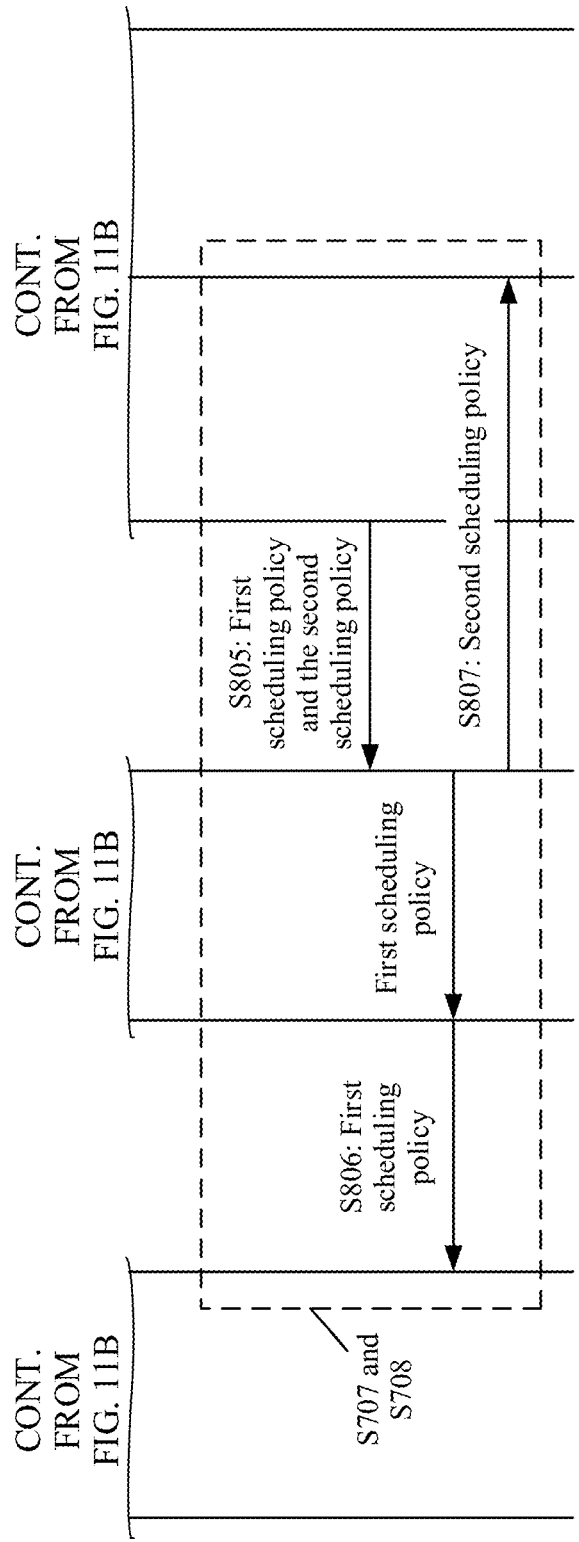

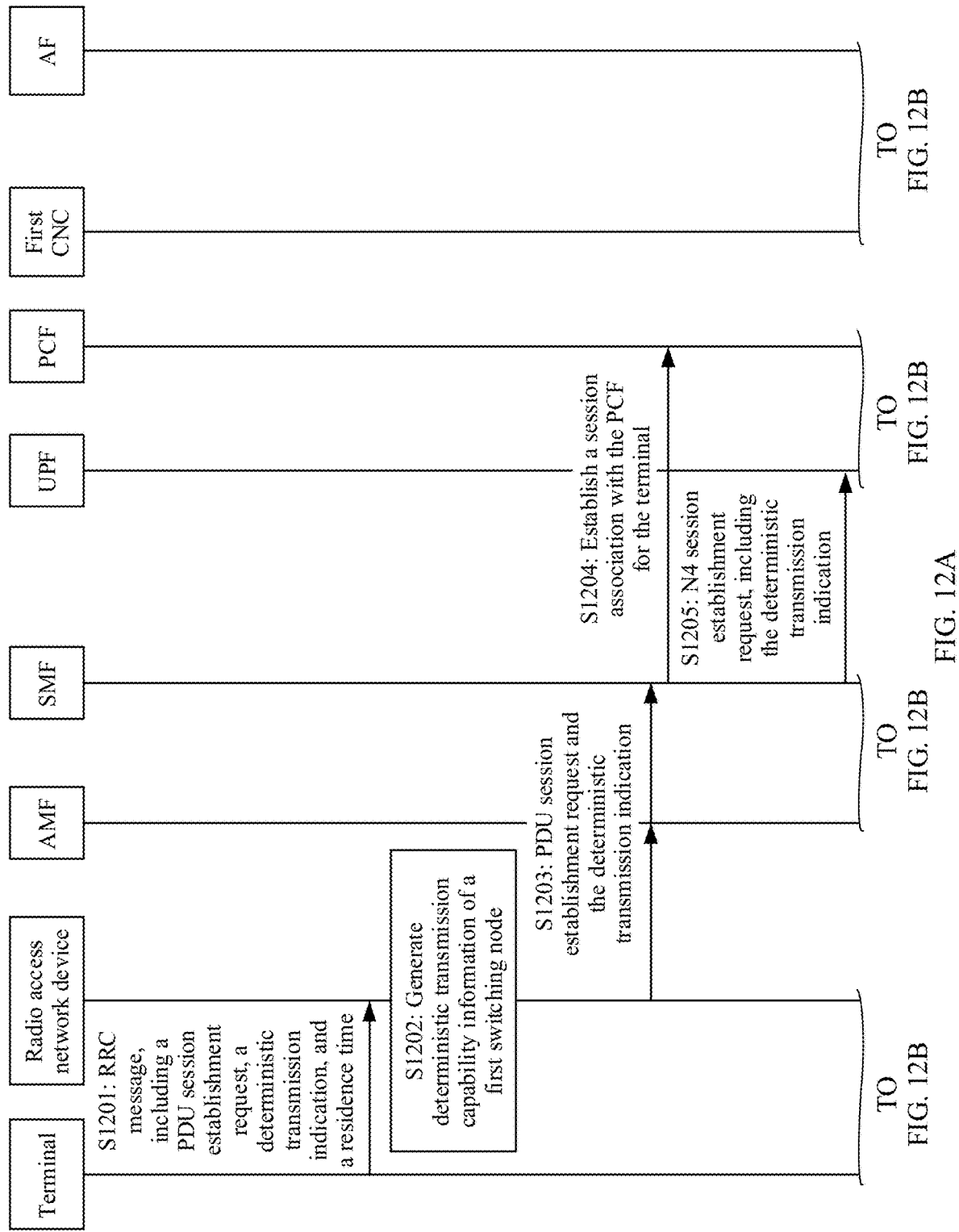

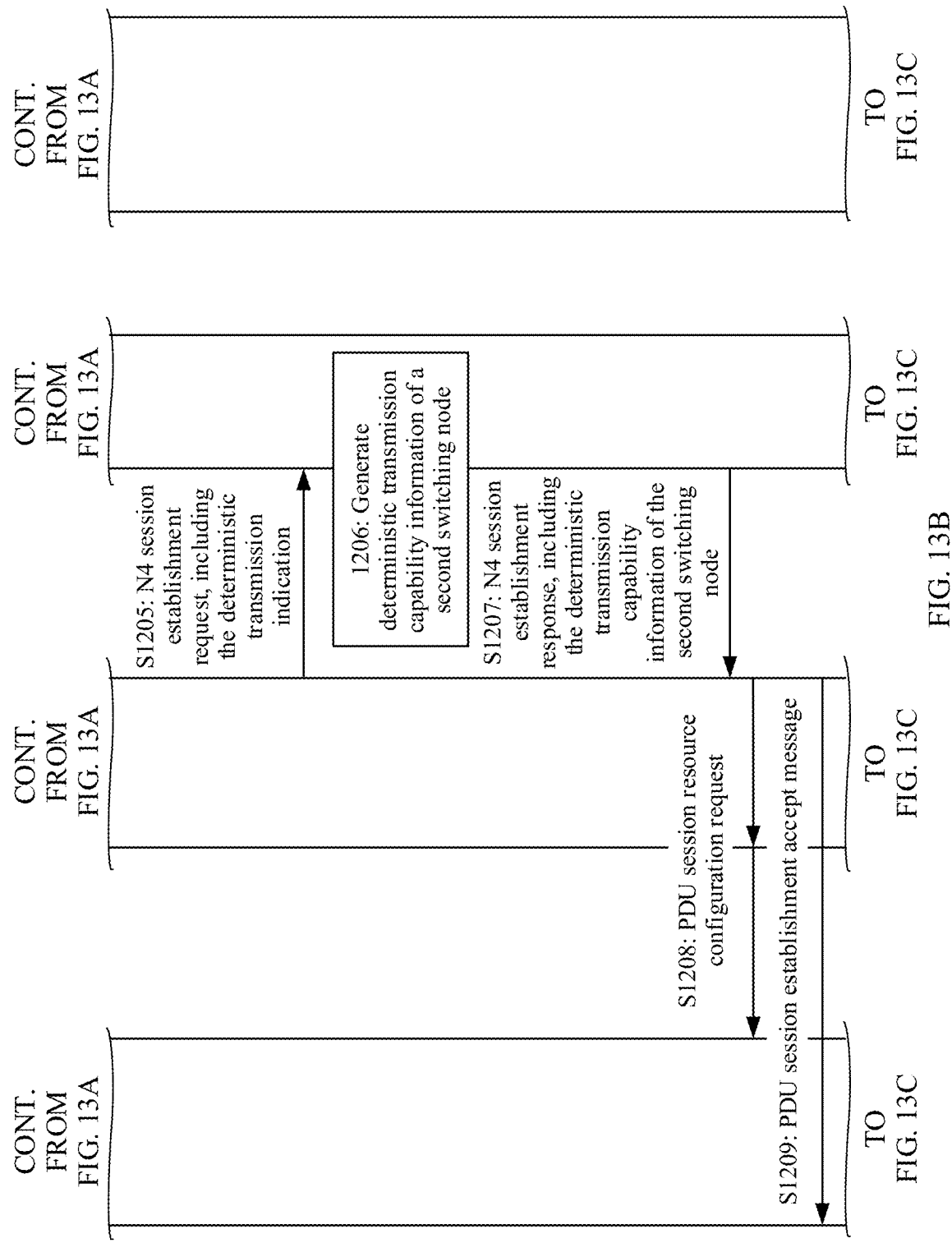

DETERMINISTIC TRANSMISSION METHOD, COMMUNICATION APPARATUS, AND STORAGE MEDIUM

CROSS-REFERENCE TO RELATED APPLICATIONS

This application is a continuation of International Application No. PCT/CN2021/098743, filed on Jun. 7, 2021, which claims priority to Chinese Patent Application No. 202010774757.1, filed on Aug. 4, 2020. The disclosures of the aforementioned applications are hereby incorporated by reference in their entireties.

TECHNICAL FIELD

Embodiments of this application relate to the communication field, and in particular, to a deterministic transmission method, a communication apparatus, and a storage medium.

BACKGROUND

Time-sensitive networking (TSN) may enable an Ethernet to be real-time and deterministic to ensure transmission reliability of delay-sensitive service data, and can predict an end-to-end transmission delay, to meet requirements in fields such as automobile control and industrial Internet.

To implement end-to-end deterministic transmission in a fifth generation mobile communication system (5GS), the 5GS may be simulated as a switching node (e.g., a bridge) in the TSN. For example, the entire 5GS may serve as a bridge in the TSN, and send information about the 5GS to a centralized network configuration (CNC) in the TSN network. The CNC may generate a scheduling policy based on the information about the 5GS and a deterministic service transmission requirement that comes from a centralized user configuration (CUC) in the TSN network, and send the scheduling policy to the 5GS. The 5GS can implement deterministic transmission according to the scheduling policy sent by the CNC.

However, in the existing manner in which the 5GS is simulated as the bridge in the TSN to implement end-to-end deterministic transmission in the 5GS, both a radio access network (RAN) and a UPF perform data transmission based on best effort. This is easy to cause a large delay variation of a quality of service (QoS) flow carrying a TSN flow in the 5GS, thereby increasing a delay indicator of the QoS flow. In addition, each network element in the 5GS can view only a partial situation of data transmission but cannot view an overall link situation of the data transmission, and consequently cannot dynamically balance network resources between different QoS flows for different user equipments (user equipment, UE).

SUMMARY

Embodiments of this application provide a deterministic transmission method, a communication apparatus, and a storage medium, to reduce a delay variation of a quality of service QoS flow carrying a TSN flow in a 5GS, thereby avoiding an excessively high delay indicator of the QoS flow. In addition, a plurality of network elements in the 5GS can dynamically balance network resources between different QoS flows for different UEs.

According to a first aspect, an embodiment of this application provides a deterministic transmission method. A radio access network device generates deterministic transmission capability information of a first switching node, where the first switching node includes the radio access network device and a terminal; the radio access network device sends the deterministic transmission capability information of the first switching node to a first network element; and the radio access network device receives a first scheduling policy from the first network element, where the first scheduling policy is generated by the first network element based on the deterministic transmission capability information of the first switching node.

In an embodiment, the radio access network device may generate the deterministic transmission capability information of the first switching node, report the deterministic transmission capability information to the first network element, and receive the first scheduling policy that is delivered by the first network element based on the deterministic transmission capability information of the first switching node. Then, the radio access network device may perform deterministic transmission according to the first scheduling policy, so that a delay variation of a QoS flow carrying a TSN flow in a 5GS can be reduced, thereby avoiding a need to select a QoS flow whose delay indicator is excessively high for the TSN flow.

In an embodiment, in generating the deterministic transmission capability information, the radio access network device determines a deterministic transmission delay of the first switching node based on one or more of a residence time of the terminal, a signal-to-noise ratio between the radio access network device and the terminal, a bandwidth allocated to a quality of service flow of the terminal, and a priority of the quality of service flow of the terminal.

In an embodiment, before the radio access network device determines the deterministic transmission delay of the first switching node based on the one or more of the residence time of the terminal, the signal-to-noise ratio between the radio access network device and the terminal, the bandwidth allocated to the quality of service flow of the terminal, and the priority of the quality of service flow of the terminal, the radio access network device receives the residence time from the terminal.

In this design, the residence time of the terminal may be sent by the terminal to the radio access network device. For example, the terminal may send the residence time to the radio access network device by using an RRC message.

In an embodiment, before the radio access network device determines the deterministic transmission delay of the first switching node based on the one or more of the residence time of the terminal, the signal-to-noise ratio between the radio access network device and the terminal, the bandwidth allocated to the quality of service flow of the terminal, and the priority of the quality of service flow of the terminal, the radio access network device obtains the residence time of the terminal when the radio access network device learns that a deterministic transmission characteristic of the terminal is authorized to be activated in a process in which the terminal is switched from an idle mode to a connected mode.

In this design, the residence time of the terminal may be obtained by the radio access network device when the radio access network device learns that the deterministic transmission characteristic of the terminal is authorized to be activated in the process in which the terminal is switched from the idle mode to the connected mode.

In an embodiment, in determining a deterministic transmission delay of the first switching node based on one or more of a residence time of the terminal, a signal-to-noise ratio between the radio access network device and the terminal, a bandwidth allocated to a quality of service flow of the terminal, and a priority of the quality of service flow of the terminal, the radio access network device determines a first transmission delay of the first switching node based on a correspondence between a first transmission delay, a signal-to-noise ratio, a bandwidth, and a data priority used for deterministic transmission, and based on one or more of the signal-to-noise ratio between the radio access network device and the terminal, the bandwidth allocated to the quality of service flow of the terminal, and the priority of the quality of service flow of the terminal; and the radio access network device determines the deterministic transmission delay of the first switching node based on the residence time of the terminal and the first transmission delay of the first switching node.

In a possible correspondence between a first transmission delay, a signal-to-noise ratio, a bandwidth, and a data priority used for deterministic transmission, the signal-to-noise ratio between the radio access network device and the terminal and the bandwidth allocated to the quality of service flow of the terminal may correspond to one or more standards or levels. Each level may correspond to one or more priorities (priority), and each level and one priority corresponding to the level may correspond to one first transmission delay. In this case, different combinations of levels and priorities correspond to a plurality of first transmission delays.

In an embodiment, before the radio access network device generates the deterministic transmission capability information of the first switching node, the radio access network device receives a deterministic transmission indication from the terminal.

In this design, after receiving the deterministic transmission indication from the terminal, the radio access network device may generate the deterministic transmission capability information of the first switching node.

In an embodiment, in receiving a deterministic transmission indication from the terminal, the radio access network device receives a radio resource control (RRC) message from the terminal, where the RRC message includes the deterministic transmission indication.

In this design, the terminal may send the deterministic transmission indication to the radio access network device by using the RRC message.

In an embodiment, the radio access network device further sends the deterministic transmission indication to a session management function (SMF).

In this design, the radio access network device sends the deterministic transmission indication to the SMF, and then the SMF can send the deterministic transmission indication to a UPF, so that the UPF generates deterministic transmission capability information of a second switching node and reports the deterministic transmission capability information to the first network element.

In an embodiment, that the radio access network device receives a deterministic transmission indication from the terminal includes: The radio access network device receives the deterministic transmission indication from an SMF, where the deterministic transmission indication is sent by the terminal to the SMF.

In this design, the terminal may first send the deterministic transmission indication to the SMF through an AMF, and the radio access network device may receive the deterministic transmission indication from the SMF.

In an embodiment, the radio access network device sends updated deterministic transmission capability information of the first switching node to the first network element.

In this design, when the deterministic transmission capability information of the first switching node changes, the radio access network device can send the updated deterministic transmission capability information of the first switching node to the first network element in time, so that the first network element can update the first scheduling policy.

In an embodiment, the first network element is a first centralized network configuration CNC, a policy control function PCF, a network exposure function NEF, or an SMF.

According to a second aspect, an embodiment of this application provides a communication apparatus. The apparatus has functions of implementing the method according to the first aspect. The functions may be implemented by hardware, or may be implemented by using hardware executing corresponding software. The hardware or software includes one or more units or modules corresponding to the functions of implementing the method according to the first aspect.

For example, the communication apparatus may include: a generation module, configured to generate deterministic transmission capability information of a first switching node, where the first switching node includes a radio access network device and a terminal; a sending module, configured to send the deterministic transmission capability information of the first switching node to a first network element; and a receiving module, configured to receive a first scheduling policy from the first network element, where the first scheduling policy is generated by the first network element based on the deterministic transmission capability information of the first switching node.

In an embodiment, the generation module is configured to determine a deterministic transmission delay of the first switching node based on one or more of a residence time of the terminal, a signal-to-noise ratio between the radio access network device and the terminal, a bandwidth allocated by the radio access network device to a quality of service flow of the terminal, and a priority of the quality of service flow of the terminal.

In an embodiment, the receiving module is further configured to receive the residence time from the terminal.

In an embodiment, the receiving module is further configured to obtain the residence time of the terminal when the receiving module learns that a deterministic transmission characteristic of the terminal is authorized to be activated in a process in which the terminal is switched from an idle mode to a connected mode.

In an embodiment, the generation module is configured to: determine a first transmission delay of the first switching node based on a correspondence between a first transmission delay, a signal-to-noise ratio, a bandwidth, and a data priority used for deterministic transmission, and based on one or more of the signal-to-noise ratio between the radio access network device and the terminal, the bandwidth allocated by the radio access network device to the quality of service flow of the terminal, and the priority of the quality of service flow of the terminal; and determine the deterministic transmission delay of the first switching node based on the residence time of the terminal and the first transmission delay of the first switching node.

In an embodiment, the receiving module is further configured to receive a deterministic transmission indication from the terminal.

In an embodiment, the receiving module is configured to receive a radio resource control RRC message from the terminal, where the RRC message includes the deterministic transmission indication.

In an embodiment, the sending module is further configured to send the deterministic transmission indication to a session management function SMF.

In an embodiment, the receiving module is configured to receive the deterministic transmission indication from an SMF, where the deterministic transmission indication is sent by the terminal to the SMF.

In an embodiment, the sending module is further configured to send updated deterministic transmission capability information of the first switching node to the first network element.

In an embodiment, the first network element is a first centralized network configuration (CNC), a policy control function (PCF), a network exposure function (NEF), or an SMF.

According to a third aspect, an embodiment of this application further provides a communication apparatus, including a processor, configured to execute computer instructions stored in a memory. When the computer instructions are executed, the apparatus is enabled to perform the method according to any one of the first aspect or the possible embodiments of the first aspect.

According to a fourth aspect, an embodiment of this application further provides a communication apparatus, including a processor and an interface circuit. The processor is configured to: communicate with another apparatus through the interface circuit, and perform the method according to any one of the first aspect or the possible designs of the first aspect.

The communication apparatus according to the second aspect to the fourth aspect can be used in the radio access network device.

According to a fifth aspect, an embodiment of this application further provides a computer-readable storage medium, including computer software instructions. When the computer software instructions are run in a radio access network device or a chip built in a radio access network device, the radio access network device is enabled to perform the method according to the first aspect.

It can be understood that for beneficial effects that can be achieved in the second aspect to the fifth aspect that are provided above, refer to the beneficial effects according to any one of the first aspect or the possible design manners of the first aspect. Details are not described herein again.

According to a sixth aspect, an embodiment of this application provides a deterministic transmission method. A user plane function (UPF) generates deterministic transmission capability information of a second switching node, where the second switching node includes the UPF; the UPF sends the deterministic transmission capability information of the second switching node to a first network element; and the UPF receives a second scheduling policy from the first network element, where the second scheduling policy is generated by the first network element based on the deterministic transmission capability information of the second switching node.

In an embodiment, the UPF may generate the deterministic transmission capability information of the second switching node, report the deterministic transmission capability information to the first network element, and receive the second scheduling policy that is delivered by the first network element based on the deterministic transmission capability information of the second switching node. Then, the UPF may perform deterministic transmission according to the second scheduling policy, so that a delay variation of a QoS flow carrying a TSN flow in a 5GS can be reduced, thereby avoiding a need to select a QoS flow whose delay indicator is excessively high for the TSN flow.

In an embodiment, that a UPF generates deterministic transmission capability information of a second switching node includes: The UPF determines an egress port and a priority of the egress port; and the UPF determines a second transmission delay of the second switching node based on the egress port, the priority of the egress port, and a correspondence between a second transmission delay, an egress port, and a priority of the egress port, and uses the second transmission delay as a deterministic transmission delay of the second switching node.

In an embodiment, before the UPF generates the deterministic transmission capability information of the second switching node, the method further includes: The UPF receives a deterministic transmission indication from an SMF.

In this design, the deterministic transmission indication of the SMF may be sent by a terminal to the SMF through an AMF, or may be sent by a radio access network device to the SMF through the AMF.

In an embodiment, the UPF sends updated deterministic transmission capability information of the second switching node to the first network element.

In this design, when the deterministic transmission capability information of the second switching node changes, the UPF can send the updated deterministic transmission capability information of the second switching node to the first network element in time, so that the first network element can update the second scheduling policy.

In an embodiment, the first network element is a first CNC, a PCF, an NEF, or an SMF.

According to a seventh aspect, an embodiment of this application provides a communication apparatus. The apparatus has functions of implementing the method according to the sixth aspect. The functions may be implemented by hardware, or may be implemented by using hardware executing corresponding software. The hardware or software includes one or more units or modules corresponding to the functions of implementing the method according to the sixth aspect.

For example, the communication apparatus may include: a generation module, configured to generate deterministic transmission capability information of a second switching node, where the second switching node includes a UPF; a sending module, configured to send the deterministic transmission capability information of the second switching node to a first network element; and a receiving module, configured to receive a second scheduling policy from the first network element, where the second scheduling policy is generated by the first network element based on the deterministic transmission capability information of the second switching node.

In an embodiment, the generation module is configured to: determine an egress port and a priority of the egress port; and determine a second transmission delay of the second node based on the egress port, the priority of the egress port, and a correspondence between a second transmission delay, an egress port, and a priority of the egress port, and use the second transmission delay as a deterministic transmission delay of the second switching node.

In an embodiment, the receiving module is further configured to receive a deterministic transmission indication from an SMF.

In an embodiment, the sending module is further configured to send updated deterministic transmission capability information of the second switching node to the first network element.

In an embodiment, the first network element is a first CNC, a PCF, an NEF, or an SMF.

According to an eighth aspect, an embodiment of this application further provides a communication apparatus, including a processor, configured to execute computer instructions stored in a memory. When the computer instructions are executed, the apparatus is enabled to perform the method according to any one of the sixth aspect or the possible designs of the sixth aspect.

According to a ninth aspect, an embodiment of this application further provides a communication apparatus, including a processor and an interface circuit. The processor is configured to: communicate with another apparatus through the interface circuit, and perform the method according to any one of the sixth aspect or the possible designs of the sixth aspect.

The communication apparatus according to the second aspect to the fourth aspect can be used in a core network device, for example, can be used in a core network device carrying the UPF.

According to a tenth aspect, an embodiment of this application further provides a computer-readable storage medium, including computer software instructions. When the computer software instructions are run in a core network device or a chip built in a core network device, the core network device is enabled to perform the method according to the sixth aspect.

It can be understood that for beneficial effects that can be achieved in the seventh aspect to the tenth aspect that are provided above, refer to the beneficial effects according to any one of the sixth aspect or the possible design manners of the sixth aspect. Details are not described herein again.

According to an eleventh aspect, an embodiment of this application provides a deterministic transmission method. The method includes: A first network element receives deterministic transmission capability information of a first switching node from a radio access network device and deterministic transmission capability information of a second switching node from a UPF, where the first switching node includes the radio access network device and a terminal, and the second switching node includes the UPF; the first network element generates a first scheduling policy and a second scheduling policy based on the deterministic transmission capability information of the first switching node and the deterministic transmission capability information of the second switching node; and the first network element sends the first scheduling policy to the radio access network device, and sends the second scheduling policy to the UPF.

In an embodiment, the radio access network device may report the deterministic transmission capability information of the first switching node to the first network element, and the UPF may report the deterministic transmission capability information of the second switching node to the first network element. The first network element may generate the first scheduling policy and the second scheduling policy based on the deterministic transmission capability information of the first switching node, the deterministic transmission capability information of the second switching node, and a deterministic service transmission request, send the first scheduling policy to the radio access network device, and send the second scheduling policy to the UPF. Then, the first switching node may perform deterministic service transmission according to the first scheduling policy, and the second switching node may perform deterministic service transmission according to the second scheduling policy, to implement deterministic transmission inside a 5G system. This can reduce a delay variation of a QoS flow carrying a TSN flow in the 5GS can be reduced, thereby avoiding a need to select a QoS flow whose delay indicator is excessively high for the TSN flow.

In addition, the first network element controls, according to the first scheduling policy and the second scheduling policy, the first switching node and the second switching node to perform deterministic service transmission, and can further dynamically balance network resources between different QoS flows for different terminals. For example, if a QoS flow 1 is delay-insensitive and a QoS flow 2 is delay-sensitive, a RAN and the UPF may preferentially schedule network resources to transmit a data packet of the QoS flow 2 on a premise of ensuring that a basic requirement of the QoS flow 1 can be met.

Further, in the method, TSN is performed on the 5G system, so that the RAN and the UPF can perform deterministic resource reservation and scheduling, and can improve network resource utilization. Moreover, deterministic service transmission requirements of closed local networks such as enterprise private networks can be met.

In an embodiment, before the first network element generates the first scheduling policy and the second scheduling policy based on the deterministic transmission capability information of the first switching node and the deterministic transmission capability information of the second switching node, the method further includes: The first network element receives a deterministic service transmission request from a second network element.

That the first network element generates the first scheduling policy and the second scheduling policy based on the deterministic transmission capability information of the first switching node and the deterministic transmission capability information of the second switching node includes: The first network element generates the first scheduling policy and the second scheduling policy based on the deterministic transmission capability information of the first switching node, the deterministic transmission capability information of the second switching node, and the deterministic service transmission request.

In an embodiment, the first network element further receives updated deterministic transmission capability information of the first switching node from the radio access network device and/or updated deterministic transmission capability information of the second switching node from the UPF.

In this design, when the deterministic transmission capability information of the first switching node and/or the second switching node changes, the first network element can receive the updated deterministic transmission capability information of the first switching node and/or the updated deterministic transmission capability information of the second switching node in time, to update the first scheduling policy and/or the second scheduling policy, that is, adjust the first scheduling policy and/or the second scheduling policy.

For example, it is assumed that at a first moment, a deterministic transmission delay of the first switching node (for example, a terminal-RAN bridge) is 20 ms, and a deterministic transmission delay of the second switching node (for example, a RAN-UPF bridge) is 25 ms. In other words, in this case, a total transmission delay of the first switching node and the second switching node is 45 ms.

At a second moment (later than the first moment), if the deterministic transmission delay of the first switching node increases to 25 ms due to insufficient air interface resources or poorer air interface channel quality, to ensure the total transmission delay of 45 ms, the first network element may reduce the deterministic delay of the second switching node. For example, the second switching node may be configured as another port arrangement (Range), to adjust the deterministic transmission delay of the second switching node from the original 25 ms to 20 ms. This can ensure that the total transmission delay of the first switching node and the second switching node is still 45 ms.

For another example, it is assumed that a deterministic transmission delay of the first switching node is 20 ms, and a deterministic transmission delay of the second switching node is 25 ms. In this case, if an SNR&band of the first switching node changes, the first network element may adjust a priority for a deterministic transmission flow, to ensure that the deterministic transmission delay of the first switching node is 20 ms. In addition, because the priority is adjusted, the first network element needs to perform configuration on the second switching node for the deterministic transmission flow. When the second switching node is configured to perform transmission by using the same priority, another port arrangement (Range) in which the deterministic transmission delay corresponding to the RAN-UPF bridge is still 25 ms can be ensured. This can ensure that the total transmission delay of the first switching node and the second switching node is still 45 ms.

In an embodiment, the first network element is any one of the following network elements: a first CNC, a PCF, an NEF, and an SMF.

In an embodiment, when the first network element is the SMF, the first network element further receives a deterministic transmission indication from the terminal.

In this design, the deterministic transmission indication may be sent by the terminal to the SMF through an AMF.

In an embodiment, the first network element further sends the deterministic transmission indication to the radio access network device.

In this design, the first network element sends the deterministic transmission indication to the radio access network device, and may indicate the radio access network device to generate the deterministic transmission capability information of the first switching node.

In an embodiment, when the first network element is the SMF, the first network element receives a deterministic transmission indication from the radio access network device.

In this design, the deterministic transmission indication may be sent by the radio access network device to the SMF through an AMF.

In an embodiment, the method further includes: The first network element sends the deterministic transmission indication to the UPF.

In this design, the first network element sends the deterministic transmission indication to the UPF, and may indicate the UPF to generate the deterministic transmission capability information of the second switching node.

In an embodiment, the first network element receives the deterministic transmission capability information of the first switching node and the deterministic transmission capability information of the second switching node from the SMF, where the deterministic transmission capability information of the first switching node is sent by the radio access network device to the SMF, and the deterministic transmission capability information of the second switching node is sent by the UPF to the SMF.

When the first network element sends the first scheduling policy to the radio access network device, and sends the second scheduling policy to the UPF, the first network element sends the first scheduling policy to the radio access network device through the SMF, and sends the second scheduling policy to the UPF through the SMF.

In an embodiment, the second network element is a first centralized user configuration CUC or an application function AF.

In an embodiment, before the first network element generates the first scheduling policy and the second scheduling policy based on the deterministic transmission capability information of the first switching node and the deterministic transmission capability information of the second switching node, the first network element receives a third scheduling policy from a second CNC.

When the first network element generates the first scheduling policy and the second scheduling policy based on the deterministic transmission capability information of the first switching node and the deterministic transmission capability information of the second switching node, the first network element generates the first scheduling policy and the second scheduling policy according to the third scheduling policy, the deterministic transmission capability information of the first switching node, and the deterministic transmission capability information of the second switching node.

In this design, the entire 5GS may serve as a bridge in a larger time-sensitive network to implement deterministic transmission.

In an embodiment, before the first network element receives the third scheduling policy from the second CNC, the first network element generates deterministic transmission capability information of a first network based on the deterministic transmission capability information of the first switching node and the deterministic transmission capability information of the second switching node; and the first network element sends the deterministic transmission capability information of the first network to the second CNC.

According to a twelfth aspect, an embodiment of this application provides a communication apparatus. The apparatus has functions of implementing the method according to the eleventh aspect. The functions may be implemented by hardware, or may be implemented by using hardware executing corresponding software. The hardware or software includes one or more units or modules corresponding to the functions of implementing the method according to the eleventh aspect.

For example, the communication apparatus may include: a receiving module, configured to receive deterministic transmission capability information of a first switching node from a radio access network device and deterministic transmission capability information of a second switching node from a UPF, where the first switching node includes the radio access network device and a terminal, and the second switching node includes the UPF; a generation module, configured to generate a first scheduling policy and a second scheduling policy based on the deterministic transmission capability information of the first switching node and the deterministic transmission capability information of the second switching node; and a sending module, configured to send the first scheduling policy to the radio access network device, and send the second scheduling policy to the UPF.

In an embodiment, the receiving module is further configured to receive a deterministic service transmission request from a second network element; and the generation module is configured to generate the first scheduling policy and the second scheduling policy based on the deterministic transmission capability information of the first switching node, the deterministic transmission capability information of the second switching node, and the deterministic service transmission request.

In an embodiment, the receiving module is further configured to receive updated deterministic transmission capability information of the first switching node from the radio access network device and/or updated deterministic transmission capability information of the second switching node from the UPF.

In an embodiment, the apparatus is used in a first CNC, a PCF, an NEF, or an SMF.

In an embodiment, when the apparatus is used in the SMF, the receiving module is further configured to receive a deterministic transmission indication from the terminal.

In an embodiment, the sending module is further configured to send the deterministic transmission indication to the radio access network device.

In an embodiment, when the apparatus is used in the SMF, the receiving module is further configured to receive a deterministic transmission indication from the radio access network device.

In an embodiment, the sending module is further configured to send the deterministic transmission indication to the UPF.

In an embodiment, the receiving module is configured to receive the deterministic transmission capability information of the first switching node and the deterministic transmission capability information of the second switching node from the SMF, where the deterministic transmission capability information of the first switching node is sent by the radio access network device to the SMF, and the deterministic transmission capability information of the second switching node is sent by the UPF to the SMF; and the sending module is configured to send the first scheduling policy to the radio access network device through the SMF, and send the second scheduling policy to the UPF through the SMF.

In an embodiment, the second network element is a first centralized user configuration CUC or an application function AF.

In an embodiment, the receiving module is further configured to receive a third scheduling policy from a second CNC; and the generation module is configured to generate the first scheduling policy and the second scheduling policy according to the third scheduling policy, the deterministic transmission capability information of the first switching node, and the deterministic transmission capability information of the second switching node.

In an embodiment, the generation module is further configured to generate deterministic transmission capability information of a first network based on the deterministic transmission capability information of the first switching node and the deterministic transmission capability information of the second switching node; and the sending module is further configured to send the deterministic transmission capability information of the first network to the second CNC.

According to a thirteenth aspect, an embodiment of this application further provides a communication apparatus, including a processor, configured to execute computer instructions stored in a memory. When the computer instructions are executed, the apparatus is enabled to perform the method according to any one of the eleventh aspect or the possible designs of the eleventh aspect.

According to a fourteenth aspect, an embodiment of this application further provides a communication apparatus, including a processor and an interface circuit. The processor is configured to: communicate with another apparatus through the interface circuit, and perform the method according to any one of the eleventh aspect or the possible designs of the eleventh aspect.

The communication apparatus according to the twelfth aspect to the fourteenth aspect can be used in a core network device.

According to a fifteenth aspect, an embodiment of this application further provides a computer-readable storage medium, including computer software instructions. When the computer software instructions are run in a core network device or a chip built in a core network device, the core network device is enabled to perform the method according to the eleventh aspect.

It can be understood that for beneficial effects that can be achieved in the twelfth aspect to the fifteenth aspect that are provided above, refer to the beneficial effects according to any one of the eleventh aspect or the possible design manners of the eleventh aspect. Details are not described herein again.

According to a sixteenth aspect, an embodiment of this application provides a deterministic transmission method. The method includes: An SMF receives deterministic transmission capability information of a first switching node from a radio access network device and deterministic transmission capability information of a second switching node from a UPF, where the first switching node includes the radio access network device and a terminal, and the second switching node includes the UPF; the SMF sends the deterministic transmission capability information of the first switching node and the deterministic transmission capability information of the second switching node to a first network element; the SMF receives a first scheduling policy and a second scheduling policy from the first network element; and the SMF sends the first scheduling policy to the radio access network device, and sends the second scheduling policy to the UPF.

In this design, the first network element may be the SMF. For example, functions of the first network element in the foregoing aspect may be added to the SMF. Other beneficial effects are similar to those in the foregoing aspect. Details are not described herein again.

In an embodiment, the method further includes: The SMF receives updated deterministic transmission capability information of the first switching node from the radio access network device and/or updated deterministic transmission capability information of the second switching node from the UPF; and the SMF sends the updated deterministic transmission capability information of the first switching node and/or the updated deterministic transmission capability information of the second switching node to the first network element.

In an embodiment, the method further includes: The SMF receives a deterministic transmission indication from the terminal; and the SMF sends the deterministic transmission indication to the radio access network device and the UPF.

In an embodiment, the method further includes: The SMF receives a deterministic transmission indication from the radio access network device, where the deterministic transmission indication is sent by the terminal to the radio access network device; and the SMF sends the deterministic transmission indication to the UPF.

According to a seventeenth aspect, an embodiment of this application provides a communication apparatus. The apparatus has functions of implementing the method according to the sixteenth aspect. The functions may be implemented by hardware, or may be implemented by using hardware executing corresponding software. The hardware or software includes one or more units or modules corresponding to the functions of implementing the method according to the sixteenth aspect.

For example, the communication apparatus may include: a receiving module, configured to receive deterministic transmission capability information of a first switching node from a radio access network device and deterministic transmission capability information of a second switching node from a UPF, where the first switching node includes the radio access network device and a terminal, and the second switching node includes the UPF; and a sending module, configured to send the deterministic transmission capability information of the first switching node and the deterministic transmission capability information of the second switching node to a first network element; where the receiving module is further configured to receive a first scheduling policy and a second scheduling policy from the first network element, and the sending module is further configured to send the first scheduling policy to the radio access network device, and send the second scheduling policy to the UPF.

In an embodiment, the receiving module is further configured to receive updated deterministic transmission capability information of the first switching node from the radio access network device and/or updated deterministic transmission capability information of the second switching node from the UPF; and the sending module is further configured to send the updated deterministic transmission capability information of the first switching node and/or the updated deterministic transmission capability information of the second switching node to the first network element.

In an embodiment, the receiving module is further configured to receive a deterministic transmission indication from the terminal; and the sending module is further configured to send the deterministic transmission indication to the radio access network device and the UPF.

In an embodiment, the receiving module is further configured to receive a deterministic transmission indication from the radio access network device, where the deterministic transmission indication is sent by the terminal to the radio access network device; and the sending module is further configured to send the deterministic transmission indication to the UPF.

According to an eighteenth aspect, an embodiment of this application further provides a communication apparatus, including a processor, configured to execute computer instructions stored in a memory. When the computer instructions are executed, the apparatus is enabled to perform the method according to any one of the sixteenth aspect or the possible designs of the sixteenth aspect.

According to a nineteenth aspect, an embodiment of this application further provides a communication apparatus, including a processor and an interface circuit. The processor is configured to: communicate with another apparatus through the interface circuit, and perform the method according to any one of the sixteenth aspect or the possible designs of the sixteenth aspect.

The communication apparatus according to the second aspect to the fourth aspect can be used in a core network device, for example, can be used in a core network device carrying the SMF.

According to a twentieth aspect, an embodiment of this application further provides a computer-readable storage medium, including computer software instructions. When the computer software instructions are run in a core network device or a chip built in a core network device, the core network device is enabled to perform the method according to the sixteenth aspect.

It can be understood that for beneficial effects that can be achieved in the seventeenth aspect to the twentieth aspect that are provided above, refer to the beneficial effects according to any one of the sixteenth aspect or the possible design manners of the sixteenth aspect. Details are not described herein again.

According to a twenty-first aspect, an embodiment of this application further provides a communication apparatus, including a transceiver unit and a processing unit. The transceiver unit may be configured to send and receive information, or may be configured to communicate with another network element. The processing unit may be configured to process data. For example, the apparatus can implement the method according to any one of the first aspect, the sixth aspect, the eleventh aspect, and the sixteenth aspect by using the transceiver unit and the processing unit.

According to a twenty-second aspect, an embodiment of this application further provides a computer program product. When the computer program product is executed, the method according to any one of the first aspect, the sixth aspect, the eleventh aspect, and the sixteenth aspect can be implemented.

According to a twenty-third aspect, an embodiment of this application further provides a chip system. The chip system is applied to a radio access network device. The chip system includes one or more interface circuits and one or more processors. The interface circuit and the processor are interconnected through a line. The processor receives computer instructions from a memory of an electronic device through the interface circuit and executes the computer instructions, to implement the method according to the first aspect.

According to a twenty-fourth aspect, an embodiment of this application further provides a chip system. The chip system is applied to a core network device. The chip system includes one or more interface circuits and one or more processors. The interface circuit and the processor are interconnected through a line. The processor receives computer instructions from a memory of an electronic device through the interface circuit and executes the computer instructions, to implement the method according to the sixth aspect.

According to a twenty-fifth aspect, an embodiment of this application further provides a chip system. The chip system is applied to a core network device. The chip system includes one or more interface circuits and one or more processors. The interface circuit and the processor are interconnected through a line. The processor receives computer instructions from a memory of an electronic device through the interface circuit and executes the computer instructions, to implement the method according to the eleventh aspect.

According to a twenty-sixth aspect, an embodiment of this application further provides a chip system. The chip system is applied to a core network device. The chip system includes one or more interface circuits and one or more processors. The interface circuit and the processor are interconnected through a line. The processor receives computer instructions from a memory of an electronic device through the interface circuit and executes the computer instructions, to implement the method according to the sixteenth aspect.

It can be understood that for beneficial effects that can be achieved in the twenty-first aspect to the twenty-sixth aspect that are provided above, refer to the beneficial effects according to the first aspect, the sixth aspect, the eleventh aspect, the sixteenth aspect, and the like. Details are not described herein again.

BRIEF DESCRIPTION OF DRAWINGS

FIG. 9A, FIG. 9B, and FIG. 9C are still another schematic flowchart of a deterministic transmission method according to an embodiment of this application;

FIG. 10A, FIG. 10B, and FIG. 10C are still another schematic flowchart of a deterministic transmission method according to an embodiment of this application;

FIG. 11A, FIG. 11B, and FIG. 11C are still another schematic flowchart of a deterministic transmission method according to an embodiment of this application;

FIG. 12A, FIG. 12B, and FIG. 12C are still another schematic flowchart of a deterministic transmission method according to an embodiment of this application;

FIG. 13A, FIG. 13B, and FIG. 13C are still another schematic flowchart of a deterministic transmission method according to an embodiment of this application;

DESCRIPTION OF EMBODIMENTS

In a process of forwarding data in a conventional Ethernet network, when a large quantity of data packets arrive at a forwarding port instantaneously, a problem of a high forwarding delay or a packet loss is caused. Consequently, the conventional Ethernet cannot provide a service with high reliability and a guaranteed transmission delay, and cannot meet requirements in fields such as automobile control and industrial Internet.

The Institute of Electrical and Electronics Engineers (IEEE) has defined a related time-sensitive networking (TSN) standard for reliable delay transmission requirements. The standard provides reliable delay transmission services based on layer-2 switching. The TSN may enable an Ethernet to be real-time and deterministic to ensure transmission reliability of delay-sensitive service data, and can predict an end-to-end transmission delay, to meet requirements in fields such as automobile control and industrial Internet.

Figure 1:
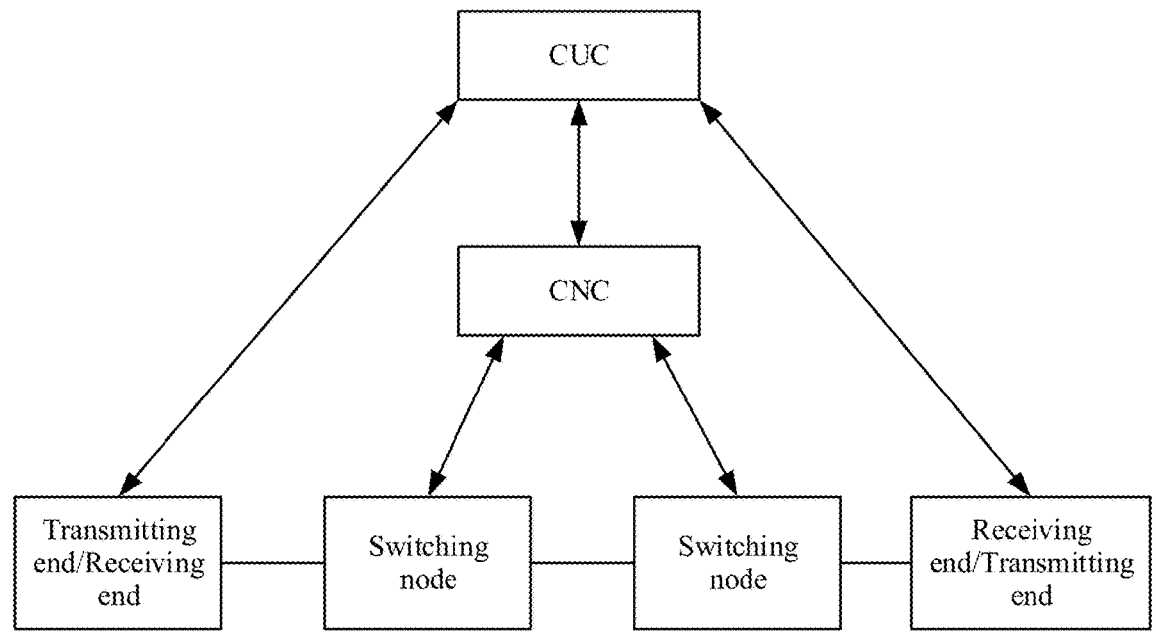
FIG. 1 is a schematic diagram of a fully centralized configuration model of a time-sensitive network.

IEEE 802.1cc defines a total of three configuration models for TSN: a fully distributed configuration model, a centralized network/distributed user configuration model, and a fully centralized configuration model. A fully centralized configuration model is used as an example. FIG. 1 is a schematic diagram of a fully centralized configuration model of a time-sensitive network.

As shown in FIG. 1, in the fully centralized configuration model, a management plane includes two network elements: a centralized user configuration (CUC) and a centralized network configuration (CNC), a switching node (e.g., a bridge), a transmitting end (talker), and a receiving end (e.g., a listener).

The CUC is responsible for managing users (namely, the talker and the listener) and services, for example, receiving talker and listener registration, receiving flow information, and exchanging configuration parameters. The CNC is responsible for managing bridges in a TSN network, for example, maintaining a network topology of the TSN, calculating scheduling policies on the bridges, and delivering the scheduling policies to the bridges. The bridge may be a router, a layer-2 (media access control (MAC) layer) switch, or the like. The scheduling policies delivered by the CNC to the bridges may include scheduling parameters such as a stream ID, a receiving time window, a sending time window, and a sending cycle.

The following provides an example of some scheduling parameters in a scheduling policy delivered by the CNC to a bridge:

TSN_Bridge1 >show tsn folw detail
Flow 1001
Stream ID: Howl
Stream Address: 0300.5EA0.03E9
Frame Size: 64B
Ingress Interface: Rx Schedule
Gil/5: 350-363 (us)
Egress Interface: TX Schedule
Gil/4: 390-403 (us)
Period cycle time: 1000 (us)

"flow1" indicates a flow ID. "Gil/5: 350-363" indicates a receiving time window. "Gil/4: 390-403" indicates a sending time window. 1000 indicates a sending cycle.

The bridge may forward a packet between the talker and the listener according to the scheduling policy delivered by the CNC.

With rapid development of a wireless communication technology, a 5GS can be applied to deterministic transmission of service data, to improve transmission efficiency and reduce many problems in terms of costs, security, maintenance, and the like of a wired network.

Figure 2:
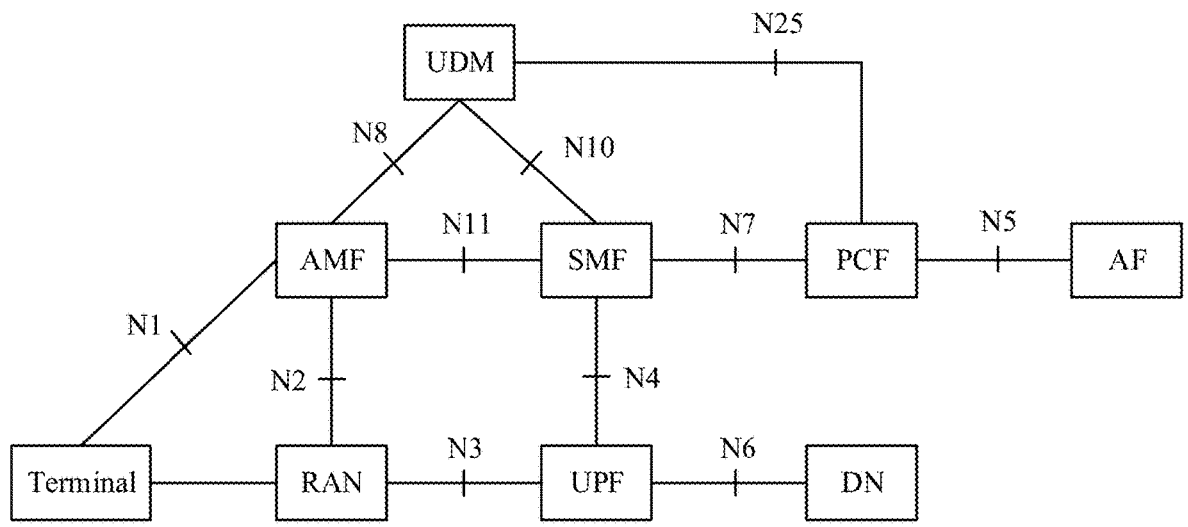
FIG. 2 is a schematic diagram of composition of a 5G system.

FIG. 2 is a schematic diagram of composition of a 5G system. As shown in FIG. 2, a 5GS may include a terminal, a radio access network (RAN), a core network, and a data network (DN).

The terminal, which may also be referred to as user equipment (user equipment, UE), may be a mobile phone (e.g., a "cellular" phone), a cell phone, a computer, a cordless telephone set, a session initiation protocol (SIP) phone, a wireless local loop (WLL) station, a personal digital assistant (PDA), a laptop computer, a handheld communication device, a handheld computing device, a satellite wireless device, a wireless modem card, a set top box (STB), a customer-premises equipment (CPE), a wearable device (for example, a smartwatch, a smart band, or a pedometer), a vehicle-mounted device (for example, an automobile, a bicycle, an electric car, an airplane, a ship, a train, or a high-speed railway), a virtual reality (VR) device, an augmented reality (AR) device, a wireless terminal in industrial control, a smart household device (for example, a refrigerator, a television set, an air conditioner, or an electricity meter), a smart robot, a workshop device, a wireless terminal in self-driving, a wireless terminal in a remote medical surgery, a wireless terminal in a smart grid, a wireless terminal in transportation safety, a wireless terminal in a smart city, a wireless terminal in a smart home, a flight device (for example, a smart robot, a hot air balloon, a drone, or an airplane), another device used for communication in a wireless system, or the like. A specific representation form of the terminal is not limited in this application.

The RAN is used to implement a radio access—related function for the terminal, and may also be referred to as an access network for short. A network device in the RAN may be referred to as a radio access network device. The terminal may communicate with a core network device through the radio access network device, and access the DN by using the core network device. The radio access network device may provide functional services such as radio resource management, quality of service management, and data encryption and compression for the terminal. The radio access network device may communicate with the core network device through a next generation (NG) interface, and different radio access network devices may communicate with each other through an Xn interface.

In some embodiments, the radio access network device may be a next generation node (gNB), a next generation evolved node (next generation evolved node B, ng-eNB), a centralized unit (CU), a distributed unit (DU), a central unit-control plane (CU-CP), a central unit-user plane (CU-UP), or the like.

The gNB may provide a control plane and/or user plane protocol and function of new radio (new radio, NR) for the terminal, and is connected to a 5G core (5GC) network. The ng-eNB may provide a control plane and/or user plane protocol and function of evolved universal terrestrial radio access (E-UTRA) for the terminal, and is connected to the 5GC. The CU mainly includes an RRC layer, a service data adaptation protocol (SDAP) layer and a packet data convergence protocol (PDCP) layer of the gNB, or an RRC layer and a PDCP layer of the ng-eNB. The DU mainly includes a radio link control (RLC) layer, a media access control (MAC) layer, and a physical layer of the gNB or the ng-eNB.

The core network may include a plurality of signaling plane network elements, such as an access and mobility management function (AMF), a session management function (SMF), and a policy control function (PCF), an application function (AF), a unified data management (UDM) function, a user plane function (UPF), and the like that are shown in FIG. 2.

The AMF is mainly responsible for mobility management in a mobile network, for example, user location update, user network registration, and user handover.

The SMF is mainly responsible for session management in the mobile network, for example, session establishment, modification, and release. For example, the SMF may allocate an IP address to the terminal, select a UPF that provides a packet forwarding function, and terminate a session management part in a non-access stratum (NAS) message.

The PCF is responsible for providing policies for the AMF and the SMF, for example, a QoS policy and a slice selection policy.

The AF is responsible for providing services for a 3GPP network, for example, providing information affecting service routing and interacting with the PCF for policy control.

The UDM is configured to store terminal (e.g., user) data, for example, subscription information and authentication/authorization information.

The UPF is mainly responsible for processing user packets, such as forwarding and charging.

The terminal may access the DN by establishing a PDU session between the terminal, the RAN, the UPF, and the DN.

The DN is an operator network that provides data transmission services for users, for example, an IP multimedia service (IMS) and the Internet.

Optionally, in the 5GS, network elements in the core network may further include a network exposure function (NEF), and may receive information from another network function or send information to another network function.

Currently, to implement end-to-end deterministic transmission in the 5GS, the 5GS may be simulated as a bridge in TSN.

Figure 3:
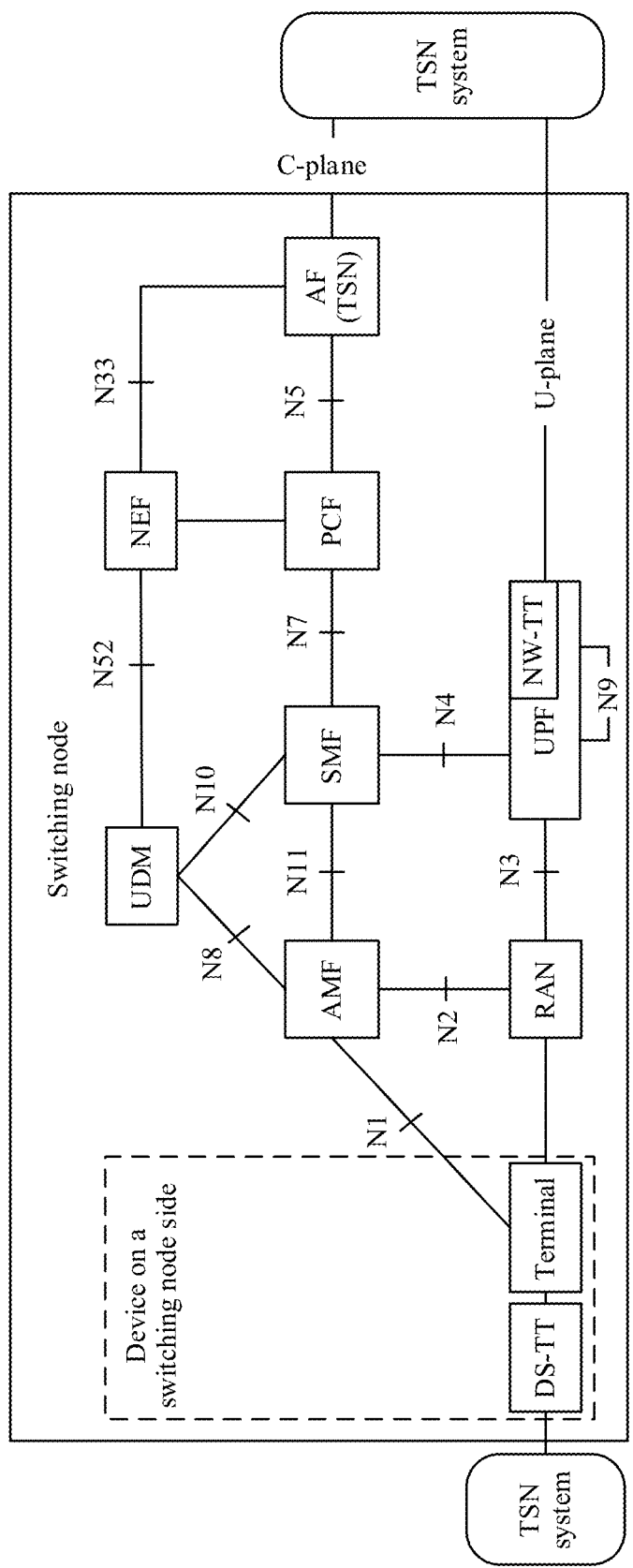
FIG. 3 is a schematic diagram of a system architecture of interworking between a 5G system and a TSN.

For example, FIG. 3 is a schematic diagram of a system architecture of interworking between a 5G system and a TSN.

As shown in FIG. 3, when the 5G system interworks with the TSN, the 5GS and a TSN translator (TT) are used as a logical TSN bridge as a whole, and the 5GS interacts with the TSN (including a TSN system) through an AF, for example, exchanges information with a switching node in the TSN. The exchanged information includes 5GS bridge capability information, TSN configuration information, time scheduling information of an ingress/egress port of the TSN, time synchronization information, and the like.

The TSN translator (DS-TT) on the terminal side may be located inside the terminal or outside the terminal. The TSN translator (NW-TT) on the UPF side is located inside the UPF.

Figure 4:
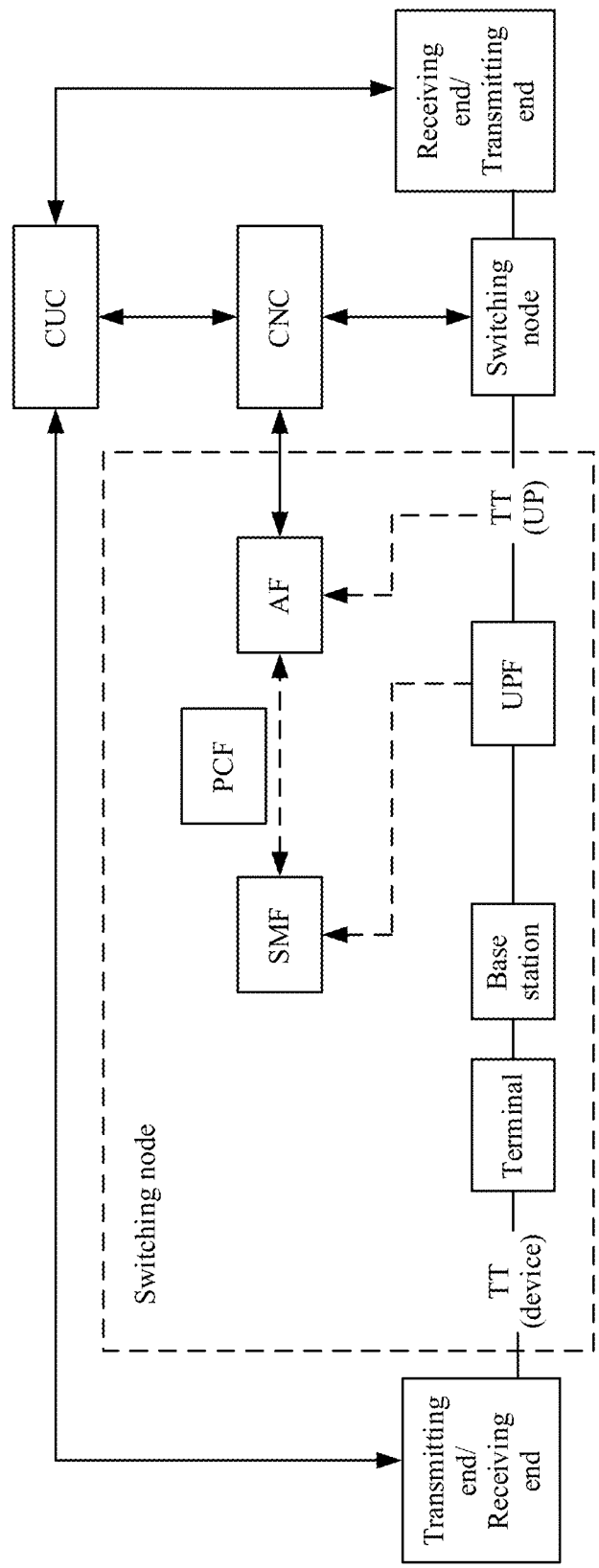
FIG. 4 is a schematic diagram of composition of an existing time-sensitive network based on a 5G system.

FIG. 4 is a schematic diagram of composition of an existing time-sensitive network based on a 5G system.

As shown in FIG. 4, in the existing TSN based on the 5GS, an AF in the 5GS can be adapted to an interface between a bridge and a CNC, and serves as an information conversion network element of the CNC and the 5GS. The 5GS may send information about the 5GS to the CNC in the TSN network through the AF. The information about the 5GS may include a bridge capability represented by a "terminal-RAN-UPF" path in the 5GS, for example, a delay of a data packet being 20 ms. The CNC may generate a scheduling policy based on the received information about the 5GS and the deterministic service transmission requirement that comes from a CUC in the TSN network, and send the scheduling policy to the 5GS. In this way, the 5GS can implement deterministic transmission according to the scheduling policy sent by the CNC.

In other words, in the existing TSN based on the 5GS, by using a black box manner, the 5GS is simulated as a switching node in the TSN network, and maps a TSN flow to a corresponding quality of service (quality of service, QoS) flow by using the NW-TT and the DS-TT.

In an embodiment, the NW-TT and the DS-TT may be added logical functions respectively on the UPF and the terminal, implements an external characteristic of the TSN switching node, and can minimize impact on existing network elements.

However, in the existing manner in which the 5GS is simulated as the bridge in the TSN to implement end-to-end deterministic transmission in the 5GS, to ensure a QoS requirement or a deterministic transmission requirement of a data flow, all interfaces (for example, the RAN and the UPF) in the network need to transmit QoS flow data in a best effort (best effort) manner. In terms of a deterministic service, the terminal buffers data and reports the data at a deterministic moment. For example, if the service data needs to be reported at 10:10:1, when the terminal receives the data at 10:9:59, the terminal buffers data and reports the data until 10:10:1. In the foregoing manner in which the RAN and the UPF perform data transmission based on the best effort, scheduling policies on the RAN and the UPF are uncontrollable. This is easy to cause a large delay variation of the QoS flow bearing the TSN flow in the 5GS, thereby increasing a delay indicator of the QoS flow.

In addition, each network element in the 5GS can view only a partial situation of data transmission but cannot view an overall link situation of the data transmission, and consequently cannot dynamically balance network resources between different QoS flows for different terminals.

When the existing manner in which the 5GS is simulated as the bridge in the TSN to implement end-to-end deterministic transmission in the 5GS is used to perform service data transmission, a large quantity of network resources need to be allocated to QoS flows triggered by external services (including a non-TSN service flow and a TSN service flow). For example, a delay requirement corresponding to a QoS flow is 10 ms. To cope with indeterminacy of N9/N3/Uu, the 5GS may need to allocate redundant resources, including a scheduling resource and a transmission resource, to each segment, to ensure that a service can arrive at the terminal within 10 ms. However, actually, QoS flow data has arrived at the terminal in 6 ms. Consequently, the existing manner in which the 5GS is simulated as the bridge in the TSN to implement end-to-end deterministic transmission in the 5GS further wastes network resources.

Further, some networks may be closed local networks such as enterprise private networks. In a corresponding enterprise application scenario, a closed loop needs to be implemented only inside a private network and is not necessarily associated with an external TSN. Therefore, TSN needs to be performed on a 5G network or the 5GS.

Based on this, an embodiment of this application provides a deterministic transmission method. Each segment on the path from the terminal to the UPF in the 5G system may be split to obtain multi-segment switching nodes, and scheduling policy configuration is performed on the multi-segment switching nodes to implement deterministic transmission. For example, the path from the terminal to the UPF may be split into the following multi-segment switching nodes: a terminal-RAN bridge, a RAN-UPF bridge, and a UPF-UPF bridge. Capability information of each segment of the multi-segment switching nodes may be reported to a first network element. The first network element has a function similar to that of the CNC in the TSN. The first network element may perform scheduling policy configuration for transmission of each segment of the multi-segment switching nodes based on the capability information of each segment of the multi-segment switching nodes, to implement deterministic transmission.

It can be understood that in some embodiments, when the path from the terminal to the UPF includes only one UPF, the multi-segment switching nodes obtained after the path is split does not include a UPF-UPF bridge.

In an embodiment, the first network element may be added to some network elements in the 5G system, for example, a PCF, an NEF, and an SMF, to implement the function of the CNC. Alternatively, the first network element may be a network element independently deployed in the 5G system, for example, a first CNC. An implementation of the first network element is not limited in this application.

The following uses an example in which the first network element is a network element "first CNC" independently deployed in the 5G system, and describes deterministic transmission methods provided in embodiments of this application by using examples with reference to the accompanying drawings.

It should be noted that in descriptions of this application, terms such as "first" and "second" are merely used for differentiated description, and are not used to particularly limit a feature. In descriptions of embodiments of this application, "and/or" describes an association relationship between associated objects and indicates that three relationships may exist. For example, A and/or B may indicate the following three cases: Only A exists, both A and B exist, and only B exists. A character "/" usually indicates an "or" relationship between associated objects. In this application, "at least one" means one or more, and "a plurality of" means two or more.

Figure 5:
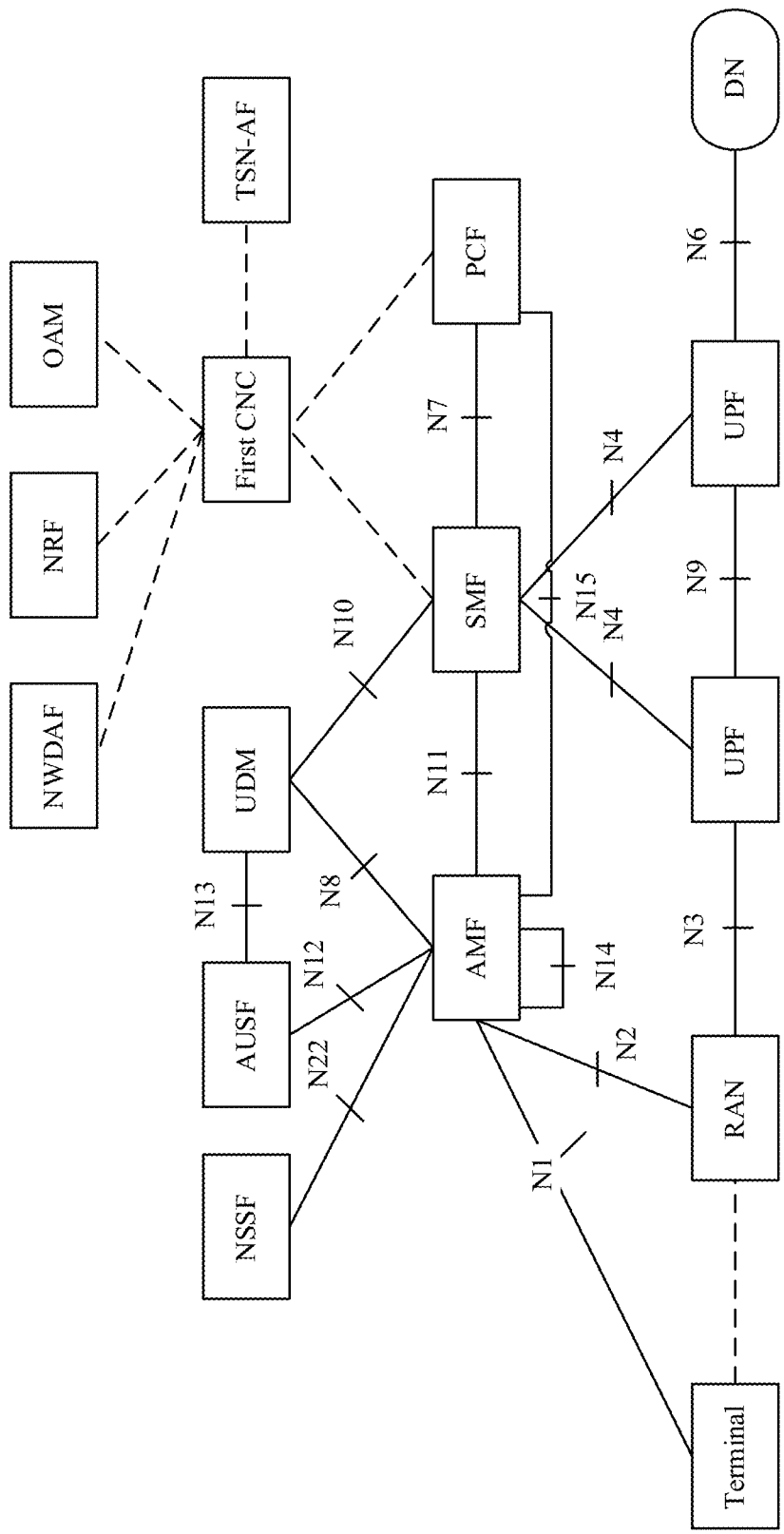
FIG. 5 is a schematic diagram of composition of a time-sensitive network based on a 5G system according to an embodiment of this application.

FIG. 5 is a schematic diagram of composition of a time-sensitive network based on a 5G system according to an embodiment of this application.

As shown in FIG. 5, in an implementation, the time-sensitive network based on the 5G system provided in this embodiment of this application may include: a terminal, a RAN, an AMF, an SMF, a PCF, an AF, a UDM, a first CNC, at least one UPF (two UPFs illustrated in FIG. 5), and the like.

For related descriptions of the terminal, the RAN, the AMF, the SMF, the PCF, the AF, the UDM, and the UPF, refer to related content in the 5G system shown in FIG. 2. Details are not described herein again.

In an embodiment, still with reference to FIG. 5, the time-sensitive network based on the 5G system provided in this embodiment of this application may further include more network devices or core-network network elements such as a network slice selection function (NSSF), an authentication server function (AUSF), a network data analysis function (NWDAF), a network repository function (NRF), and an operation, administration, and maintenance (OAM) system.

Figure 6:
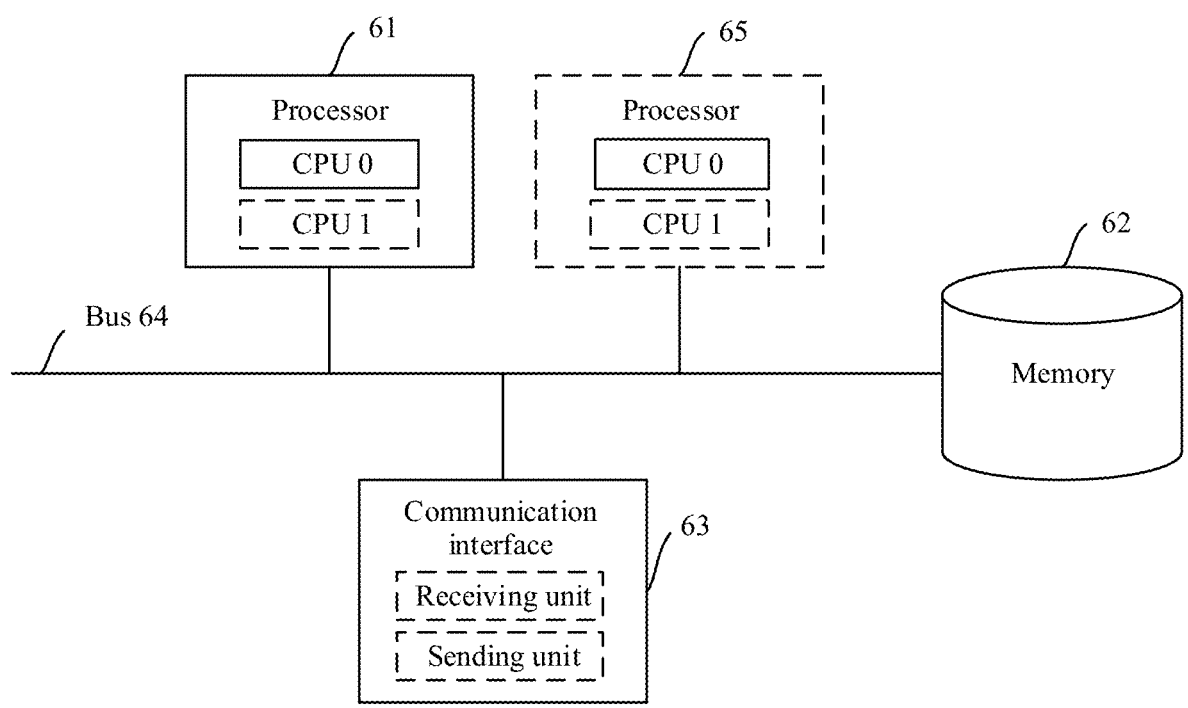
FIG. 6 is a schematic diagram of composition of a network device according to an embodiment of this application.

FIG. 6 is a schematic diagram of composition of a network device according to an embodiment of this application. The network device may be a radio access network device in a RAN in the time-sensitive network based on the 5G system shown in FIG. 5, or a core network device configured to bear one or more network elements in a core network such as an SMF, a UPF, a first CNC, a PCF, and an AF.

As shown in FIG. 6, the network device may include at least one processor 61, a memory 62, a communication interface 63, and a bus 64.

The following describes each constituent part of the network device with reference to FIG. 6.

The processor 61 is a control center of the network device, and may be a processor or may be a generic term of a plurality of processing elements. For example, the processor 61 may be a central processing unit (CPU), an application-specific integrated circuit (ASIC), or one or more integrated circuits configured to implement this embodiment of this application, for example, one or more microprocessors (DSPs) or one or more field programmable gate arrays (FPGAs).

The processor 61 may perform various functions of the network device by running or executing a software program stored in the memory 62 and by invoking data stored in the memory 62. For example, when the network device is a radio access network device, the network device may perform operations performed by the radio access network device in the deterministic transmission methods provided in embodiments of this application.

During specific implementation, in an embodiment, the processor 61 may include one or more CPUs, for example, a CPU 0 and a CPU 1 shown in FIG. 6.

During specific implementation, in an embodiment, the network device may include a plurality of processors, for example, the processor 61 and a processor 65 shown in FIG. 6. Each of the processors may be a single-core processor (single-CPU), or may be a multi-core processor (multi-CPU). Herein, the processor may be one or more devices, circuits, and/or processing cores configured to process data (for example, computer program instructions).

The memory 62 is configured to store a software program for performing method operations performed by the network device in solutions of this application, and the processor 61 controls execution of the software program. The memory 62 may be a read-only memory (ROM) or another type of static storage device that can store static information and instructions, or a random access memory (RAM) or another type of dynamic storage device that can store information and instructions; or may be an electrically erasable programmable read-only memory EEPROM), a compact disc read-only memory (CD-ROM) or another compact disk storage device, an optical disc storage device (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory 62 is not limited herein.

The memory 62 may exist independently, and is connected to the processor 61 through the bus 64. Alternatively, the memory 62 may be integrated with the processor 61. This is not limited herein.

The communication interface 63 uses an apparatus such as any transceiver, and is configured to communicate with another device or a communication network. For example, when the network device is a radio access network device, the communication interface 63 may communicate with a core network device. The communication interface 63 may be an Ethernet interface, a RAN interface, a wireless local area network (WLAN) interface, or the like. The communication interface 63 may include a receiving unit that implements a receiving function, and a sending unit that implements a sending function.

The bus 64 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus 64 is represented by using only one thick line in FIG. 6, but this does not mean that there is only one bus or only one type of bus.

The deterministic transmission methods provided in embodiments of this application can be applied to the time-sensitive network based on the 5G system shown in FIG. 5.

It can be understood that the time-sensitive network based on the 5G system shown in FIG. 5 is merely used to describe the technical solutions in embodiments of this application more clearly, but does not constitute any limitation on the technical solutions provided in embodiments of this application.

In addition, a person of ordinary skill in the art may know that, as a network architecture evolves and a new service scenario emerges, the technical solutions provided in embodiments of this application are also applicable to similar technical issues.

Figure 7:
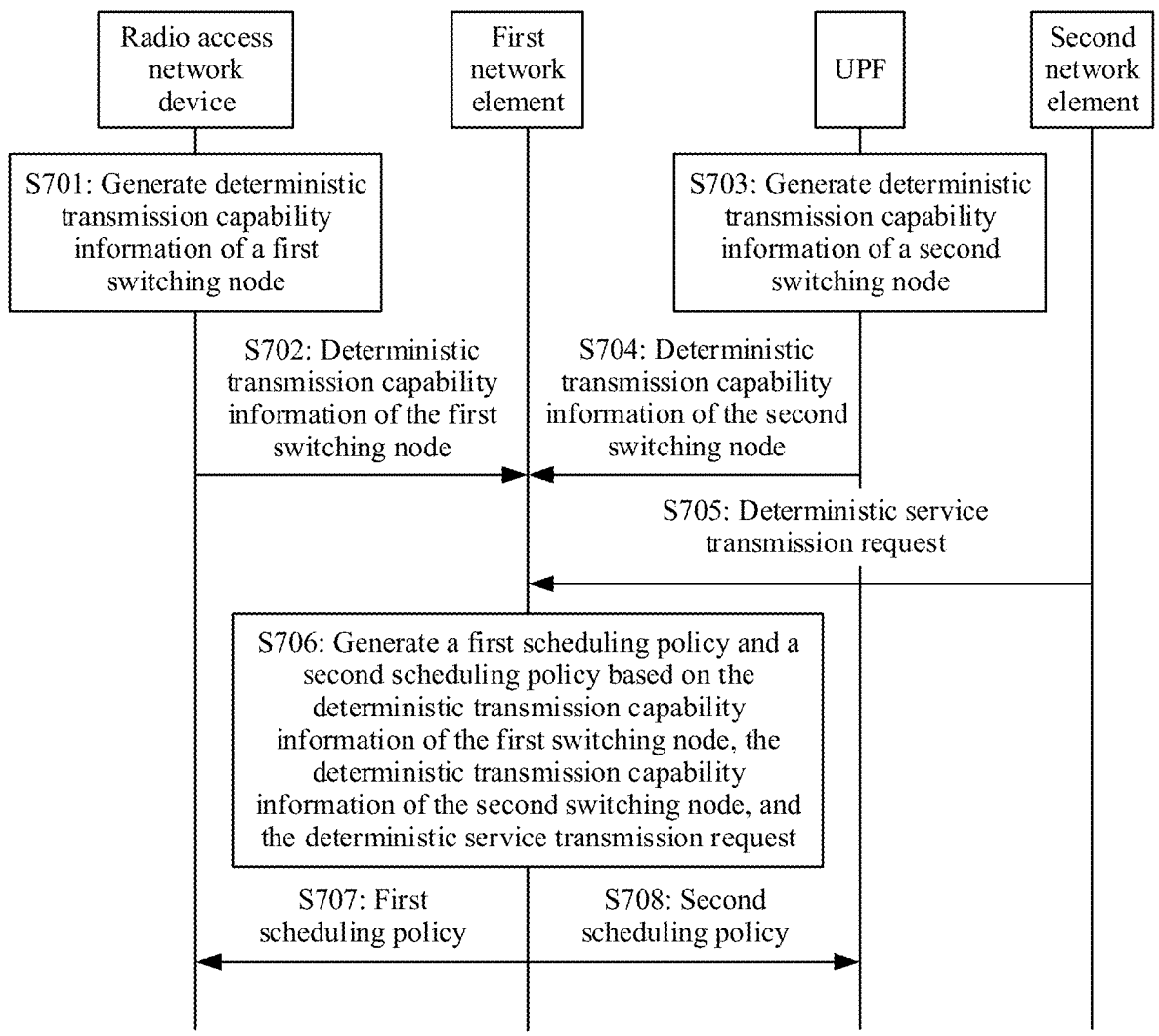
FIG. 7 is a schematic flowchart of a deterministic transmission method according to an embodiment of this application.

FIG. 7 is a schematic flowchart of a deterministic transmission method according to an embodiment of this application. As shown in FIG. 7, the deterministic transmission method may include operations S701 to S708.

Operation S701: A radio access network device generates deterministic transmission capability information of a first switching node.

The first switching node includes the radio access network device and a terminal. For example, the first switching node may be a terminal-RAN bridge.

In an embodiment, when a radio access network device generates deterministic transmission capability information of a first switching node, the radio access network device determines a deterministic transmission delay of the first switching node based on one or more of a residence time (residence time) of the terminal, a signal-to-noise ratio (SNR) between the radio access network device and the terminal, a bandwidth (band) allocated to a quality of service flow of the terminal, and a priority of the quality of service flow of the terminal.

For example, the radio access network device determines a first transmission delay of the first switching node based on one or more of the signal-to-noise ratio between the radio access network device and the terminal, the bandwidth allocated to the quality of service flow of the terminal, and the priority of the quality of service flow of the terminal. In addition, in an embodiment, a correspondence between a first transmission delay, a signal-to-noise ratio, a bandwidth, and a data priority used for deterministic transmission is configured on the radio access network device. Therefore, the radio access network device further needs to determine the first transmission delay of the first switching node with reference to the correspondence between a first transmission delay, a signal-to-noise ratio, a bandwidth, and a data priority used for deterministic transmission. Then, if the residence time of the terminal does not need to be considered, the radio access network device may determine the deterministic transmission delay of the first switching node based on the first transmission delay of the first switching node. If the residence time of the terminal needs to be considered, the radio access network device may determine the deterministic transmission delay of the first switching node based on the residence time of the terminal and the first transmission delay of the first switching node.

The residence time of the terminal may also be referred to as a dwell time, and may be a time in which the terminal processes a deterministic transmission data flow, or a time in which the terminal sends the deterministic transmission data flow to a DS-TT.

Table 1 lists a possible correspondence between a first transmission delay, a signal-to-noise ratio, a bandwidth, and a data priority used for deterministic transmission:

TABLE 1

| SNR & band | priority | | | | |
|---|---|---|---|---|---|
| | 1 | 2 | 3 | 4 | 5 |
| level 1 | 10 | 15 | 20 | 25 | 30 |
| level 2 | 15 | 20 | 25 | 30 | 35 |
| level 3 | 20 | 25 | 30 | 35 | 40 |
| level 4 | 25 | 30 | 35 | 40 | 45 |
| level 5 | 30 | 35 | 40 | 45 | 50 |
| level 6 | 35 | 40 | 45 | 50 | 55 |

As listed in Table 1, there is a mapping relationship (or a correspondence) between an SNR/band, a priority, and a first transmission delay. For example, a level 1, a priority 1, and 10 are a group of mapping relationship, where 10 indicates that a value of the first transmission delay is 10 milliseconds (ms). Similarly, a level 2, a priority 3, and 25 are a group of mapping relationship; a level 3, the priority 3, and 30 are a group of mapping relationship; and so on. Details are no longer enumerated herein.

In other words, Table 1 can be understood as a preset mapping relationship table between a first transmission delay, a signal-to-noise ratio, a bandwidth, and a data priority used for deterministic transmission.

The radio access network device may query Table 1 based on the one or more of the signal-to-noise ratio between the radio access network device and the terminal, the bandwidth allocated to the quality of service flow of the terminal, and the priority of the quality of service flow of the terminal, to determine the first transmission delay of the first switching node. Then, the radio access network device may generate the deterministic transmission delay of the first switching node based on the residence time of the terminal and the first transmission delay of the first switching node that is obtained through query. For example, a sum of the residence time of the terminal and the first transmission delay may be used as the deterministic transmission delay of the first switching node.

In an embodiment, the signal-to-noise ratio between the radio access network device and the terminal and the bandwidth allocated to the quality of service flow of the terminal may correspond to one or more levels. Each level may correspond to one or more priorities, and each level and one priority corresponding to the level may correspond to one first transmission delay. In this case, different combinations of levels and priorities correspond to a plurality of first transmission delays.

Optionally, Table 1 may be configured by an operator. The data in Table 1 may be big-data training values.

The deterministic transmission delay of the first switching node determined in the foregoing manner represents the deterministic transmission capability information of the first switching node.

Operation S702: The radio access network device sends the deterministic transmission capability information of the first switching node to a first network element.

Correspondingly, the first network element receives the deterministic transmission capability information of the first switching node from the radio access network device.

Operation S703: A UPF generates deterministic transmission capability information of a second switching node.

The second switching node includes the UPF.

For example, in some manners, the second switching node may include only a RAN-UPF bridge.

Alternatively, in some other implementations, the second switching node may include a RAN-UPF bridge and at least one UPF-UPF bridge.

In an embodiment, that a UPF generates deterministic transmission capability information of a second switching node includes: The UPF determines an egress port (egress port) and a priority (priority) of the egress port; and the UPF determines a second transmission delay of the second switching node based on the egress port and the priority of the egress port, and uses the second transmission delay as a deterministic transmission delay of the second switching node. In addition, in an embodiment, a correspondence between a second transmission delay, an egress port, and a priority of the egress port is configured on the UPF. Therefore, the UPF further needs to determine the first transmission delay of the first switching node with reference to the correspondence between a second transmission delay, an egress port, and a priority of the egress port.

Table 2 lists a possible correspondence between a second transmission delay, an egress port, and a priority of the egress port:

TABLE 2

| Egress port | priority | | | | |
|---|---|---|---|---|---|
| | 1 | 2 | 3 | 4 | 5 |
| Range 1 | 10 | 15 | 20 | 25 | 30 |
| Range 2 | 15 | 20 | 25 | 30 | 35 |
| Range 3 | 20 | 25 | 30 | 35 | 40 |
| Range 4 | 25 | 30 | 35 | 40 | 45 |
| Range 5 | 30 | 35 | 40 | 45 | 50 |
| Range 6 | 35 | 40 | 45 | 50 | 55 |

As listed in Table 2, there is a mapping relationship (or a correspondence) between an egress port, a priority, and a second delay. For example, an arrangement (Range) 1, a priority 1, and 10 are a group of mapping relationship, where 10 indicates that a value of the second delay is 10 milliseconds (ms). Similarly, a Range 2, a priority 3, and 25 are a group of mapping relationship; a Range 3, the priority 3, and 30 are a group of mapping relationship; and so on. Details are no longer enumerated herein.

A Range refers to a range of an egress port. For example, the Range 1 of the egress port refers to a port 100 to a port 600.

In other words, Table 2 can be understood as a preset mapping relationship table between a second delay, an egress port, and a priority of the egress port.

The UPF may query Table 2 based on the egress port and the priority of the egress port of the second switching node, to determine the second delay of the second switching node, and use the second delay as the deterministic transmission delay of the second switching node.

Optionally, Table 2 may be configured by an operator.

The deterministic transmission delay of the second switching node determined in the foregoing manner represents the deterministic transmission capability information of the second switching node. In an embodiment, the UPF may configure one or more priorities and/or configure one or more ports for the terminal device. In this case, the deterministic transmission delay of the second switching node may include a plurality of transmission delays, and each transmission delay corresponds to one priority and one port.

Operation S704: The UPF sends the deterministic transmission capability information of the second switching node to the first network element.

Correspondingly, the first network element receives the deterministic transmission capability information of the second switching node from the UPF.

After receiving the deterministic transmission capability information of the first switching node and the deterministic transmission capability information of the second switching node, when receiving a deterministic service transmission request sent by a second network element, the first network element may generate a first scheduling policy and a second scheduling policy based on the deterministic transmission capability information of the first switching node, the deterministic transmission capability information of the second switching node, and the deterministic service transmission request.

For example, operations S705 and S706 may be performed.

Operation S705: The first network element receives the deterministic service transmission request from the second network element.

For example, the second network element may be the AF shown in FIG. 5. A function of the CUC may be added to the AF, and the first network element is a CNC. The CNC may receive a deterministic service transmission request from the CUC, where the deterministic service transmission request may include: a service start/end time, a service cycle, a service delay requirement, a service delay variation requirement, an allowable service failure retransmission quantity, and the like.

In an embodiment, the second network element may be alternatively a network element independently deployed in a 5G system, for example, a first CUC.

Operation S706: The first network element generates the first scheduling policy and the second scheduling policy based on the deterministic transmission capability information of the first switching node, the deterministic transmission capability information of the second switching node, and the deterministic service transmission request.

For example, if the deterministic service transmission request indicates that a service delay requirement of a deterministic service is 45 ms, the deterministic transmission capability information of the first switching node indicates that the deterministic delay of the first switching node is 20 ms, and the deterministic transmission capability information of the second switching node indicates that the deterministic delay of the second switching node is 30 ms, the first scheduling policy generated by the first network element may indicate the first switching node to transmit the deterministic service based on the transmission delay of 20 ms, and the second scheduling policy generated by the first network element may indicate the second switching node to transmit the deterministic service based on the transmission delay of 25 ms. This ensures that transmission of the deterministic service meets the service delay requirement of 45 ms. In this case, the first network element triggers the second switching node to allocate a port and/or a priority corresponding to 25 ms to the terminal device.

For another example, if the deterministic service transmission request indicates that a service delay requirement of a deterministic service is 45 ms, the deterministic transmission capability information of the first switching node indicates that the deterministic delay of the first switching node is 20 ms, and the deterministic transmission capability information of the second switching node indicates that deterministic delays of the second switching node are 30 ms, 25 ms, and 15 ms, the first scheduling policy generated by the first network element may indicate the first switching node to transmit the deterministic service based on the transmission delay of 20 ms, and the second scheduling policy generated by the first network element may indicate the second switching node to transmit the deterministic service based on the transmission delay of 25 ms. This ensures that transmission of the deterministic service meets the service delay requirement of 45 ms. In this case, the first network element triggers the second switching node to allocate a port and/or a priority corresponding to 25 ms to the terminal device.

In an embodiment, the first scheduling policy and/or the second scheduling policy may include transmission class related information, gate control information, and the like.

Operation S707: The first network element sends the first scheduling policy to the radio access network device.

Correspondingly, the radio access network device receives the first scheduling policy from the first network element.

After receiving the first scheduling policy, the radio access network device may perform resource scheduling and configuration based on information such as the traffic class related information and the gate control information that are included in the first scheduling policy, to complete deterministic service transmission.

Operation S708: The first network element sends the second scheduling policy to the UPF.

Correspondingly, the UPF receives the second scheduling policy from the first network element.

After receiving the second scheduling policy, the UPF may perform resource scheduling and configuration based on information such as the traffic class related information and the gate control information that are included in the second scheduling policy, to complete deterministic service transmission.

According to the foregoing description, in an embodiment, a path from the terminal to the UPF in the 5G system may be split into the first switching node and the second switching node. The radio access network device may report the deterministic transmission capability information of the first switching node to the first network element, and the UPF may report the deterministic transmission capability information of the second switching node to the first network element. The first network element may generate the first scheduling policy and the second scheduling policy based on the deterministic transmission capability information of the first switching node, the deterministic transmission capability information of the second switching node, and the deterministic service transmission request, send the first scheduling policy to the radio access network device, and send the second scheduling policy to the UPF. Then, the first switching node may perform deterministic service transmission according to the first scheduling policy, and the second switching node may perform deterministic service transmission according to the second scheduling policy, to implement deterministic transmission inside the 5G system.

In an embodiment, the RAN and the UPF may learn a precise arrival/sending moment, a periodic characteristic, stable traffic, and the like of a deterministic service data flow, and may further perform deterministic resource reservation and scheduling, to reduce an end-to-end delay variation of data packet transmission and improve a success rate of the data packet transmission, thereby avoiding a need to select a QoS flow whose delay indicator is excessively high for a TSN flow.

In addition, in an embodiment, the RAN and the UPF learn the precise arrival/sending moment, the periodic characteristic, the stable traffic, and the like of the deterministic service data flow, and can further dynamically balance network resources between different QoS flows for different terminals. For example, if a QoS flow 1 is delay-insensitive and a QoS flow 2 is delay-sensitive, the RAN and the UPF may preferentially schedule network resources to transmit a data packet of the QoS flow 2 on a premise of ensuring that a basic requirement of the QoS flow 1 can be met.

Further, in an embodiment, TSN is performed on the 5G system, so that the RAN and the UPF can perform deterministic resource reservation and scheduling, and can improve network resource utilization. Moreover, deterministic service transmission requirements of closed local networks such as enterprise private networks can be met.

It should be noted that in the deterministic transmission method shown in FIGS. 7, S701 and S702 may be first performed, and then S703 and S704 are performed. Alternatively, S703 and S704 may be first performed, and then S701 and S702 are performed. Alternatively, S701 and S702 may be performed simultaneously with S703 and S704, or the four operations may be performed in another sequence. FIG. 7 is merely an example for description, and is not limited in this application.

The following describes a process in which the radio access network device sends the deterministic transmission capability information of the first switching node to the first network element, and a process in which the UPF sends the deterministic transmission capability information of the second switching node to the first network element.

In some embodiments, the first network element shown in FIG. 7 is the first CNC shown in FIG. 5.

For example, the first network element is the first CNC. The process in which the radio access network device sends the deterministic transmission capability information of the first switching node to the first network element may include: The radio access network device first sends the deterministic transmission capability information of the first switching node to an AMF, and the AMF transparently transmits the deterministic transmission capability information of the first switching node to an SMF; and then, the SMF forwards the deterministic transmission capability information of the first switching node to the first CNC.

Alternatively, the AMF may directly send the deterministic transmission capability information of the first switching node to the first CNC. This is not limited herein.

The process in which the UPF sends the deterministic transmission capability information of the second switching node to the first network element may include: The UPF sends the deterministic transmission capability information of the second switching node to the SMF; and then, the SMF forwards the deterministic transmission capability information of the second switching node to the first CNC.

It can be understood that the process in which the first network element sends the first scheduling policy to the radio access network device is opposite to the foregoing process of transmitting the deterministic transmission capability information of the first switching node; and the process in which the first network element sends the second scheduling policy to the UPF is opposite to the foregoing process of transmitting the deterministic transmission capability information of the second switching node.

Figure 8A:
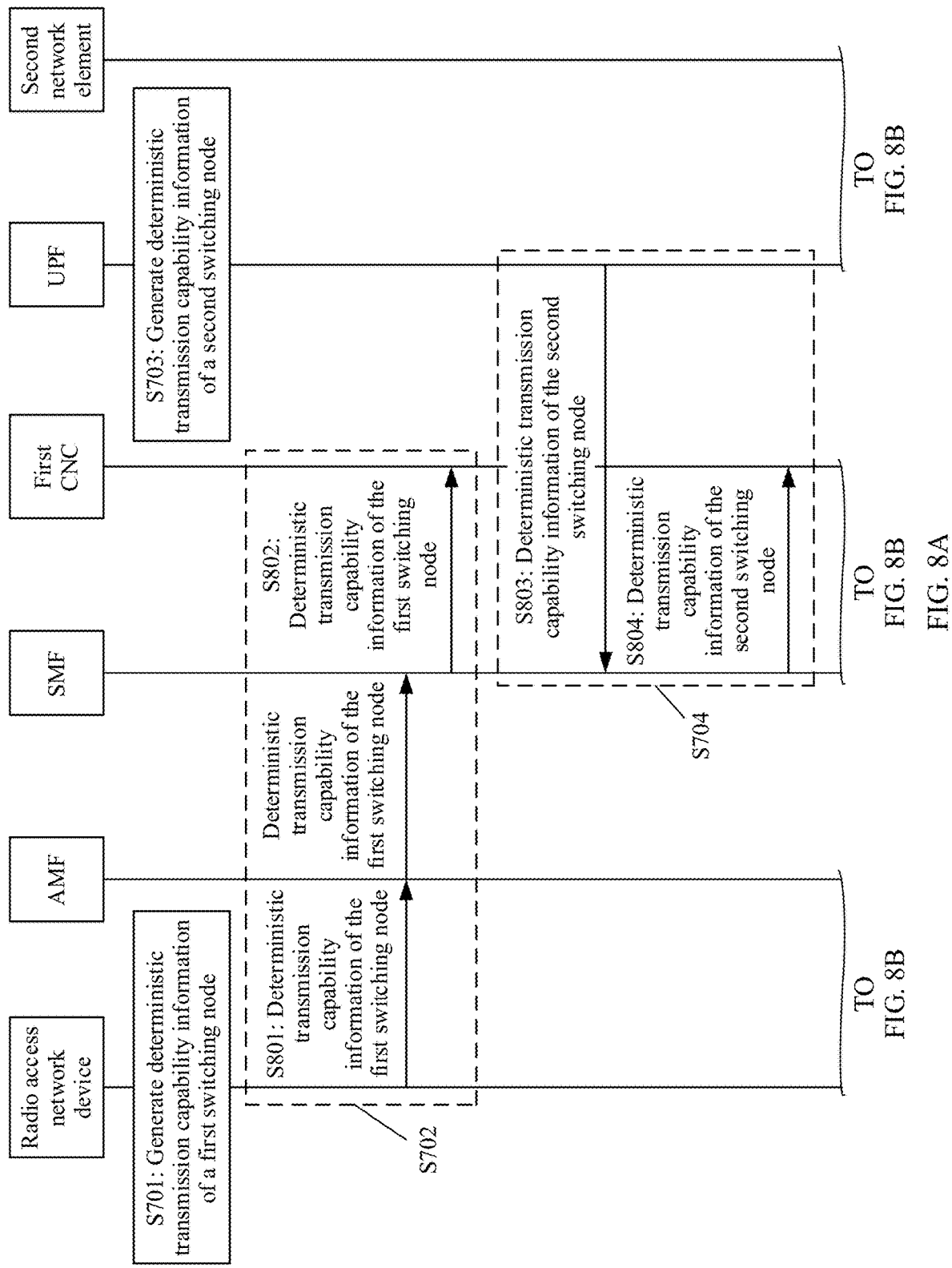
FIG. 8A and FIG. 8B are another schematic flowchart of a deterministic transmission method according to an embodiment of this application.
Figure 8B:
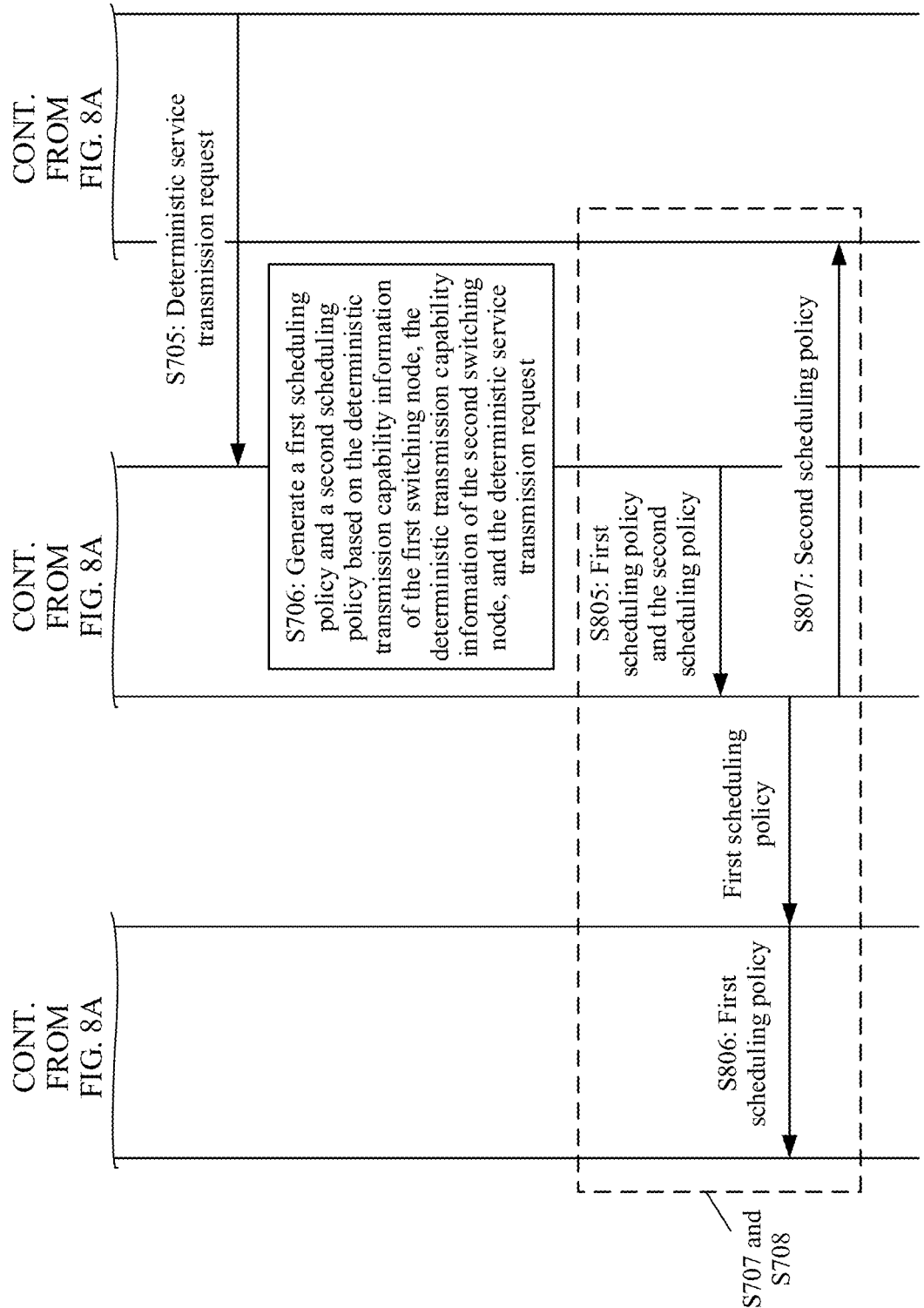

For example, FIG. 8A and FIG. 8B are another schematic flowchart of a deterministic transmission method according to an embodiment of this application.

As shown in FIG. 8A and FIG. 8B, in the deterministic transmission method shown in FIG. 7, S702 may include S801 and S802, S704 may include S803 and S804, and S707 and S708 may include operations S805 to S807.

Operation S801: The radio access network device sends the deterministic transmission capability information of the first switching node to the AMF, and the AMF transparently transmits the deterministic transmission capability information of the first switching node to the SMF.

Correspondingly, the AMF receives the deterministic transmission capability information of the first switching node from the radio access network device and transparently transmits the deterministic transmission capability information of the first switching node, and the SMF receives the deterministic transmission capability information of the first switching node transparently transmitted by the SMF.

Operation S802: The SMF sends the deterministic transmission capability information of the first switching node to the first CNC.

Correspondingly, the first CNC receives the deterministic transmission capability information of the first switching node from the SMF.

Operation S803: The UPF sends the deterministic transmission capability information of the second switching node to the SMF.

Correspondingly, the SMF receives the deterministic transmission capability information of the second switching node from the UPF.

Operation S804: The SMF sends the deterministic transmission capability information of the second switching node to the first CNC.

Correspondingly, the first CNC receives the deterministic transmission capability information of the second switching node from the SMF.

Operation S805: The first CNC sends the first scheduling policy and the second scheduling policy to the SMF.

Correspondingly, the SMF receives the first scheduling policy and the second scheduling policy from the first CNC.

Operation S806: The SMF sends the first scheduling policy to the AMF, and the AMF transparently transmits the first scheduling policy to the radio access network device.

Correspondingly, the radio access network device receives the first scheduling policy from the SMF.

Operation S807: The SMF sends the second scheduling policy to the UPF.

Correspondingly, the UPF receives the second scheduling policy from the SMF.

Alternatively, in some other embodiments, when the first network element is the SMF (that is, the first CNC and the SMF shown in FIG. 5 are integral logic functions), both the logical function performed by the SMF and the logical function performed by the first CNC that are shown in FIG. 8A and FIG. 8B can be completed by the SMF.

For example, a process in which the radio access network device sends the deterministic transmission capability information of the first switching node to the first network element may include: The radio access network device first sends the deterministic transmission capability information of the first switching node to the AMF, and the AMF transparently transmits the deterministic transmission capability information of the first switching node to the SMF. A process in which the UPF sends the deterministic transmission capability information of the second switching node to the first network element may include: The UPF first sends the deterministic transmission capability information of the second switching node to the AMF, and the AMF transparently transmits the deterministic transmission capability information of the second switching node to the SMF. The SMF may generate the first scheduling policy and the second scheduling policy based on the deterministic transmission capability information of the first switching node, the deterministic transmission capability information of the second switching node, and the deterministic service transmission request.

Alternatively, in another embodiment, when the first network element is another network element (for example, a PCF or an NEF) in a core network, the radio access network device may alternatively send the deterministic transmission capability information of the first switching node to the first network element based on another path. Details are not described herein. The UPF may alternatively send the deterministic transmission capability information of the second switching node to the first network element based on another path. Details are not described herein, either.

The following embodiments are described by using examples in which the SMF and the first network element are two independent network elements. However, it can be understood that technical solutions described in the following embodiments are also applicable to a case in which the first network element is the SMF or the first network element is another network element in the core network.

Figure 9A:
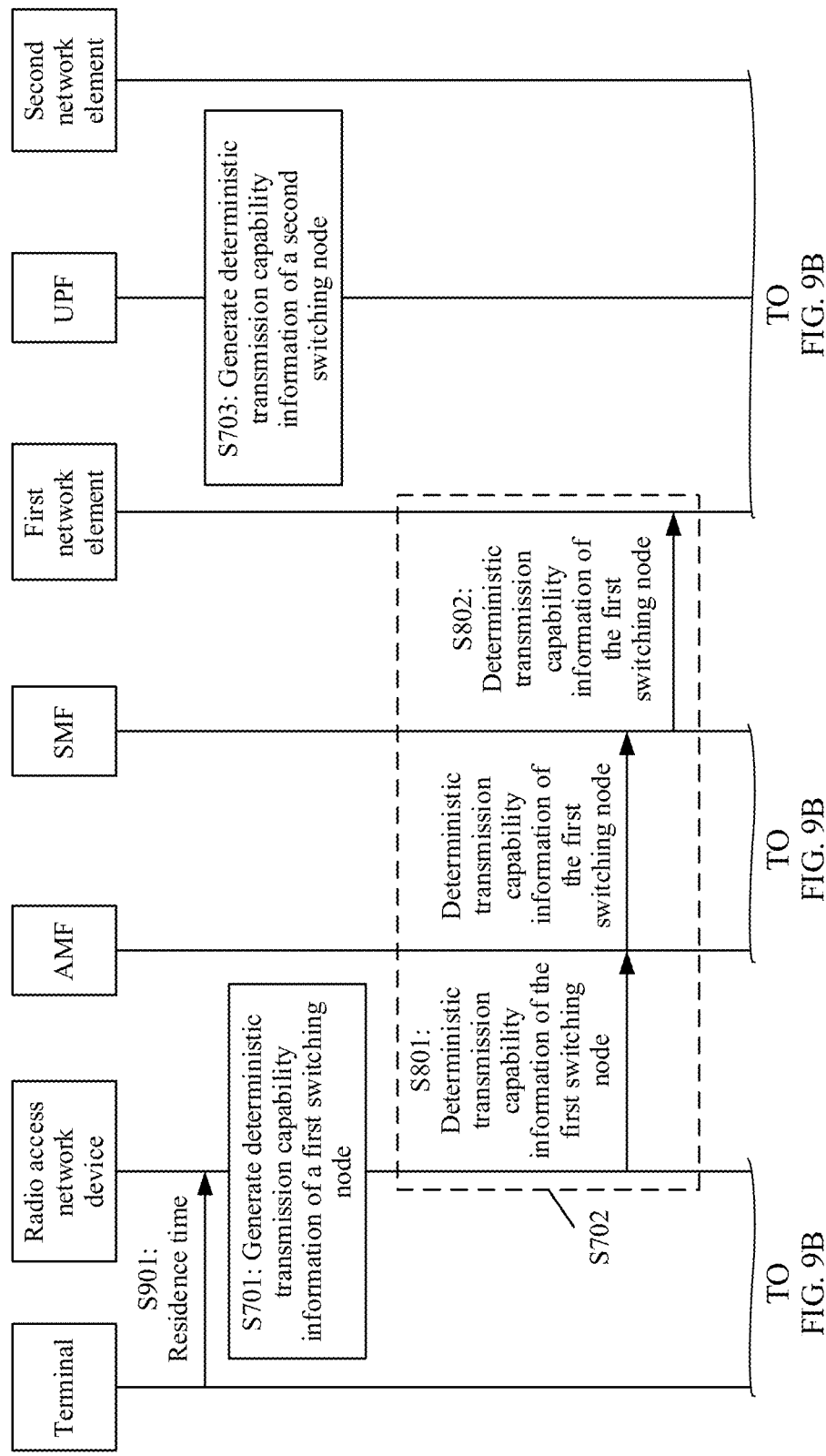

FIG. 9A, FIG. 9B, and FIG. 9C are still another schematic flowchart of a deterministic transmission method according to an embodiment of this application.

As shown in FIG. 9A, FIG. 9B, and FIG. 9C, in an embodiment, before the radio access network device determines the deterministic transmission delay of the first switching node based on the one or more of the residence time of the terminal, the signal-to-noise ratio between the radio access network device and the terminal, the bandwidth allocated to the quality of service flow of the terminal, and the priority of the quality of service flow of the terminal, the method further includes S901.

Operation S901: The terminal sends the residence time to the radio access network device.

For example, when initiating a protocol data unit (protocol data unit, PDU) session request to the radio access network device, the terminal may also send the residence time of the terminal to the radio access network device.

In an embodiment, the terminal may initiate a PDU session establishment request to the radio access network device by using a radio resource control (RRC) message. The residence time of the terminal may be carried in the RRC message.

Correspondingly, the radio access network device receives the residence time from the terminal.

The residence time of the terminal has been interpreted in the foregoing description, and details are not described herein again.

In an embodiment, before the radio access network device determines the deterministic transmission delay of the first switching node based on the one or more of the residence time of the terminal, the signal-to-noise ratio between the radio access network device and the terminal, the bandwidth allocated to the quality of service flow of the terminal, and the priority of the quality of service flow of the terminal, the radio access network device obtains the residence time of the terminal when the radio access network device learns that a deterministic transmission characteristic of the terminal is authorized to be activated in a process in which the terminal is switched from an idle mode to a connected mode.

For example, a service request process or a registration request process of the terminal triggers the terminal to switch from an idle mode to a connected mode. In this process, when learning that the deterministic transmission characteristic of the terminal is authorized to be activated, the radio access network device may obtain the residence time of the terminal, to generate the deterministic transmission capability information of the first switching node.

Whether the deterministic transmission characteristic of the terminal is authorized to be activated may be configured by the core network, for example, may be stored in a UDM as subscription information. For example, the core network may configure whether the terminal has permission to perform deterministic transmission, whether the terminal supports deterministic transmission, or the like.

In an embodiment, in some embodiments, in the foregoing deterministic transmission methods, the terminal may first send a deterministic transmission indication (e.g., a deterministic transmission flag) both to the radio access network device and the UPF. When receiving the deterministic transmission indication, the radio access network device and the UPF start to generate the deterministic transmission capability information of the first switching node and the deterministic transmission capability information of the second switching node.

Figure 10A:
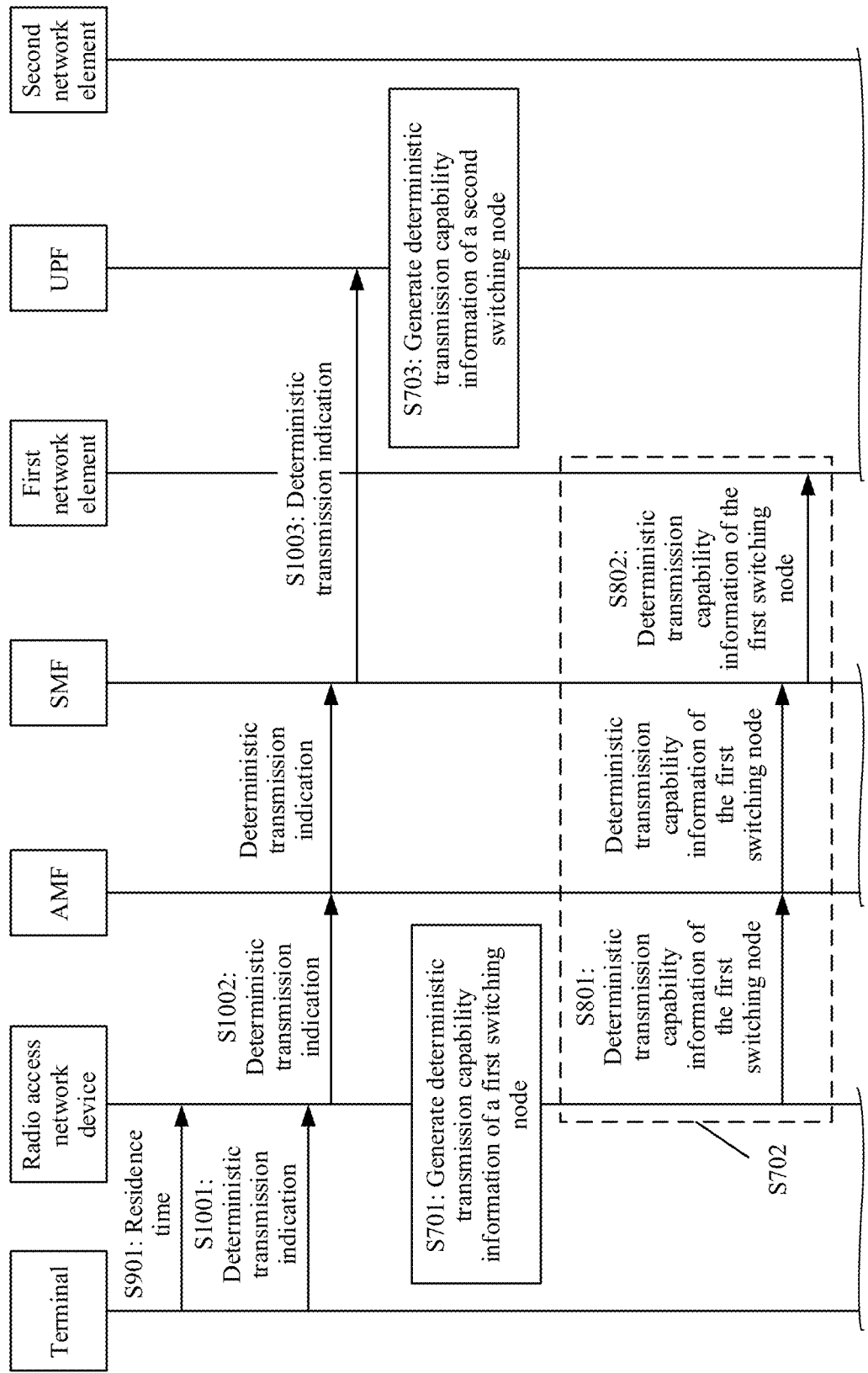
Figure 10C:
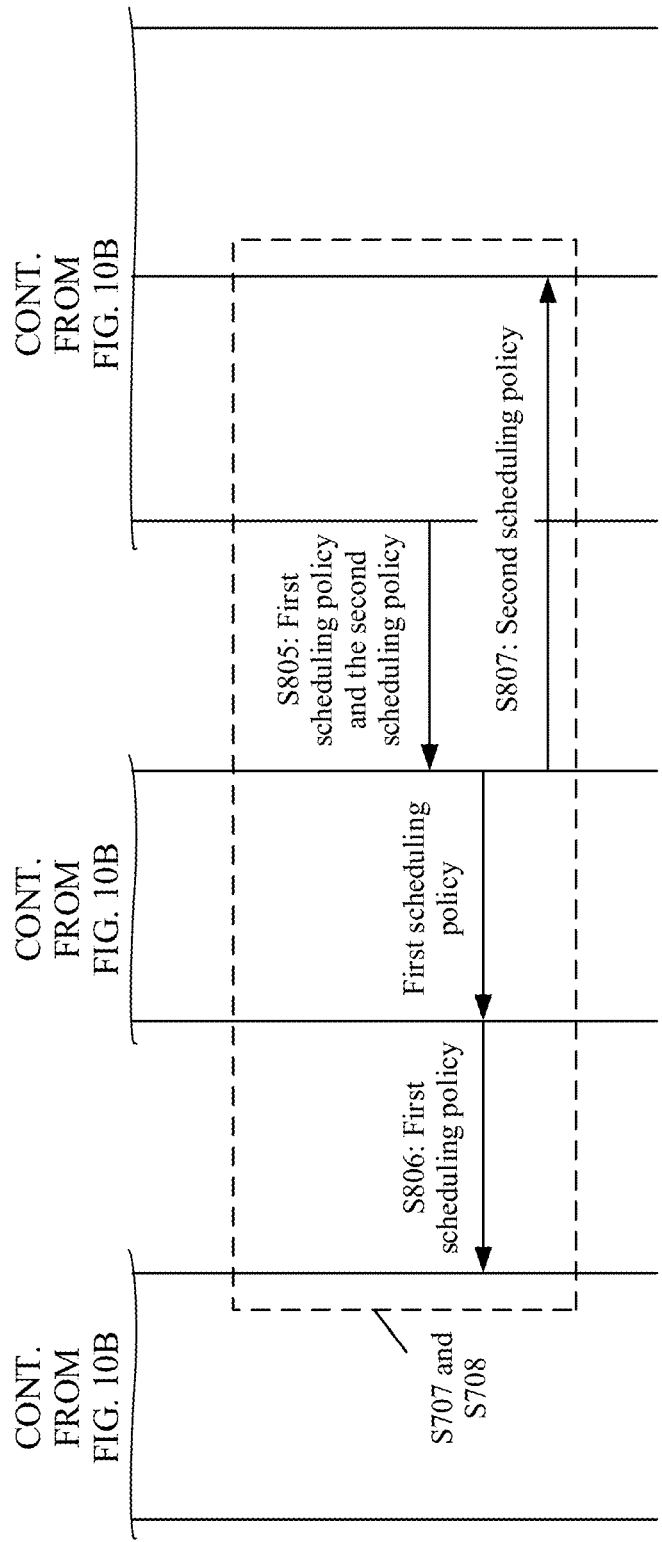

For example, FIG. 10A, FIG. 10B, and FIG. 10C are still another schematic flowchart of a deterministic transmission method according to an embodiment of this application.

As shown in FIG. 10A, FIG. 10B, and FIG. 10C, in an embodiment, based on the foregoing embodiments (using FIG. 9A, FIG. 9B, and FIG. 9C as an example), before the radio access network device generates the deterministic transmission capability information of the first switching node, the method further includes operations S1001 to S1003.

Operation S1001: The terminal sends a deterministic transmission indication to the radio access network device.

As described above, the terminal may initiate a PDU session establishment request to the radio access network device by using an RRC message. In an embodiment, if the residence time of the terminal needs to be considered, the residence time of the terminal may be carried in the RRC message.

Similarly, the deterministic transmission indication may also be carried in the RRC message and then the RRC message is sent to the radio access network device.

For example, in an implementation, the deterministic transmission indication and the PDU session establishment request may be two information elements at a same message level in the RRC message. Alternatively, in another implementation, the deterministic transmission indication may be an information element in the PDU session establishment request. This is not limited in this application.

Correspondingly, the radio access network device receives the radio resource control RRC message from the terminal, where the RRC message includes the deterministic transmission indication.

Operation S1002: The radio access network device sends the deterministic transmission indication to the AMF, and the AMF transparently transmits the deterministic transmission indication to the SMF.

Operation S1003: The SMF sends the deterministic transmission indication to the UPF.

Correspondingly, the UPF receives the deterministic transmission indication from the SMF.

It can be understood that S1002 and S1003 are unnecessarily performed before the radio access network device generates the deterministic transmission capability information of the first switching node, provided that it is ensured that S1002 and S1003 are performed before the UPF generates the deterministic transmission capability information of the second switching node.

Figure 11A:
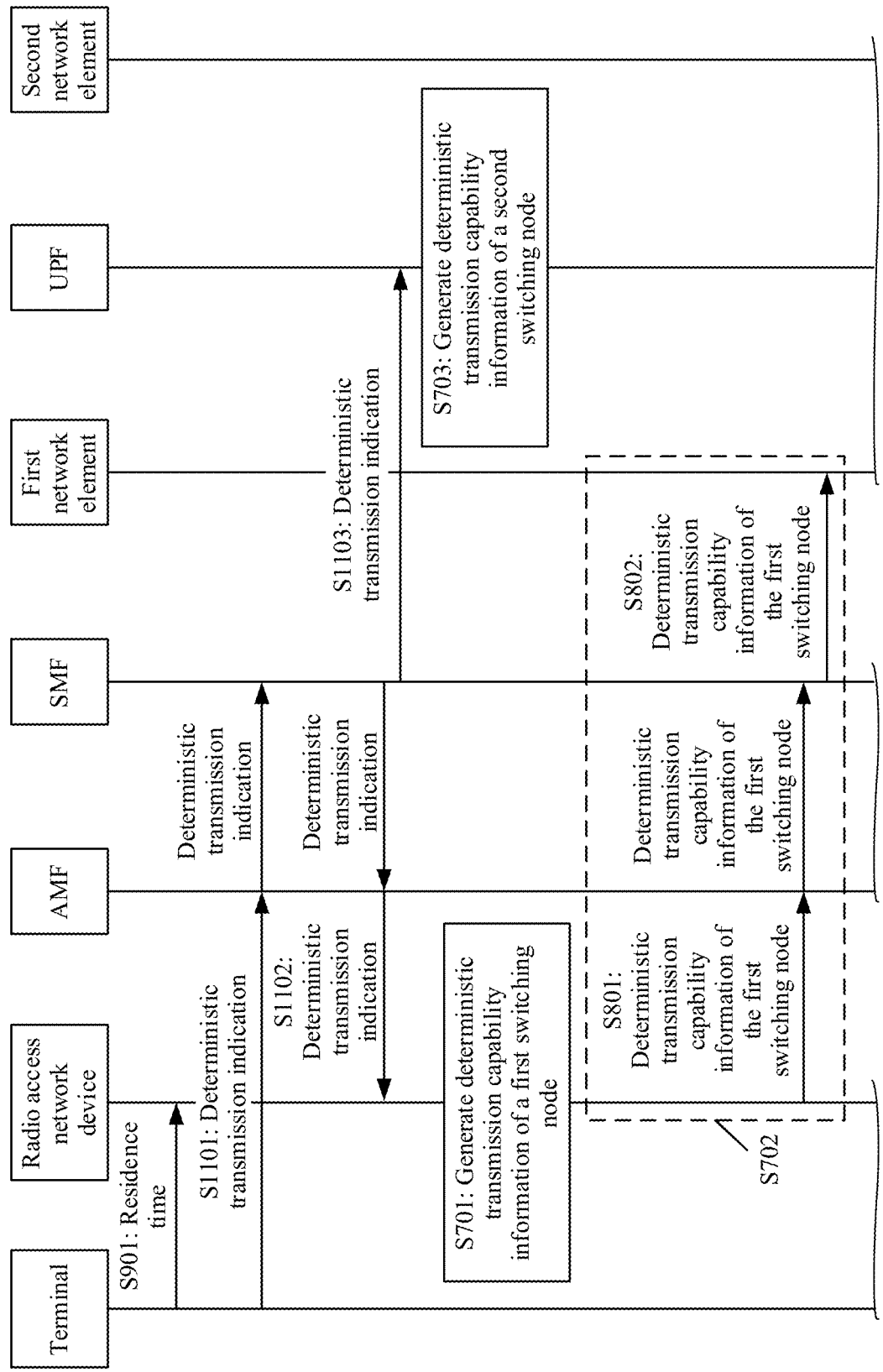

For another example, FIG. 11A, FIG. 11B, and FIG. 11C are still another schematic flowchart of a deterministic transmission method according to an embodiment of this application.

As shown in FIG. 11A, FIG. 11B, and FIG. 11C, in an embodiment, based on the foregoing embodiments (using FIG. 9A, FIG. 9B, and FIG. 9C as an example), before the radio access network device generates the deterministic transmission capability information of the first switching node and the UPF generates the deterministic transmission capability information of the second switching node, the method further includes operations S1101 to S1103.

Operation S1101: The terminal sends the deterministic transmission indication to the AMF, and the AMF transparently transmits the deterministic transmission indication to the SMF.

Operation S1102: The SMF sends the deterministic transmission indication to the AMF, and the AMF transparently transmits the deterministic transmission indication to the radio access network device.

Operation S1103: The SMF sends the deterministic transmission indication to the UPF.

The following provides an example specific implementation for the foregoing embodiments by using a process in which the terminal sends a PDU session establishment request to the radio access network device and establishes a PDU session with the UPF.

Figure 12B:
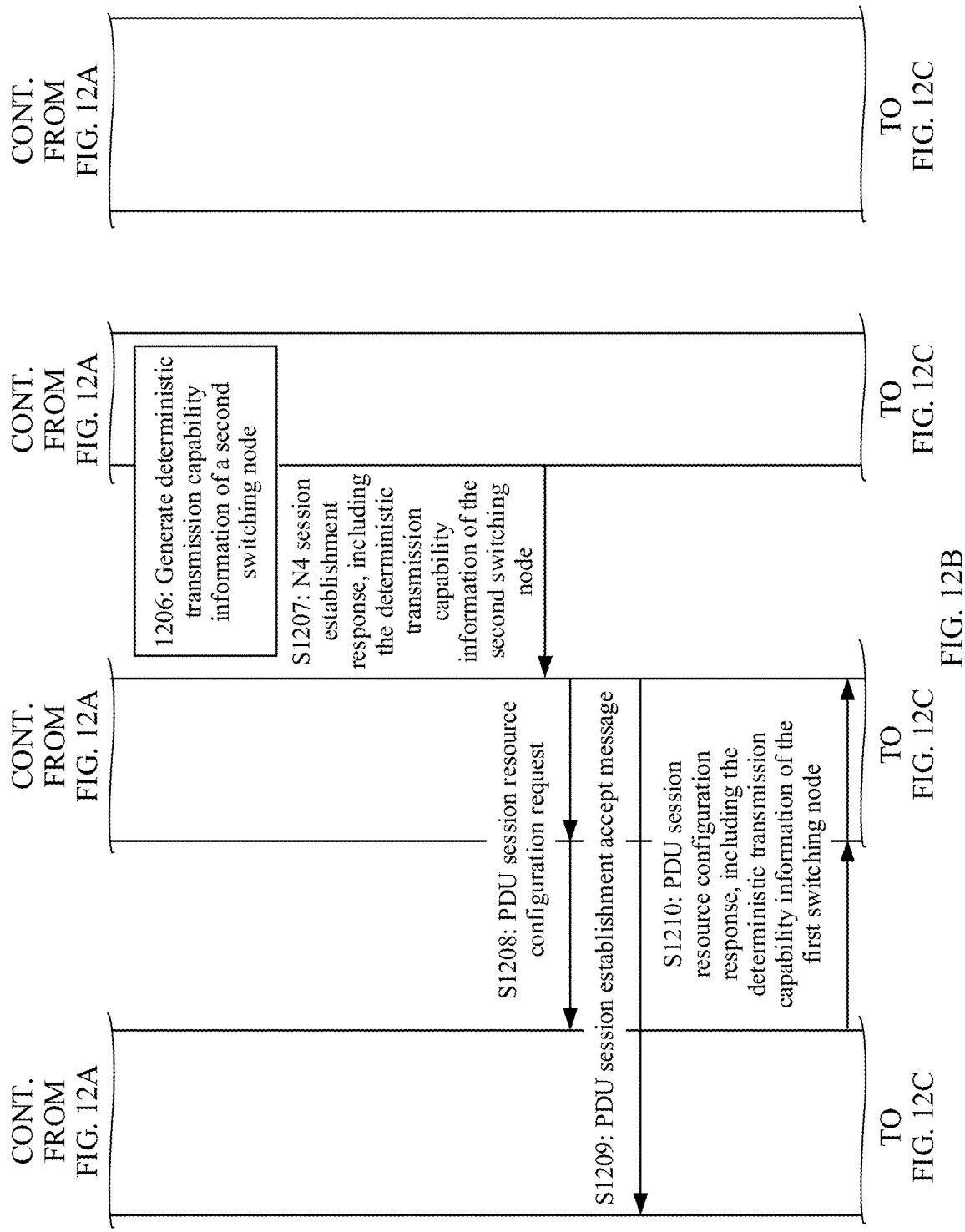
Figure 12C:
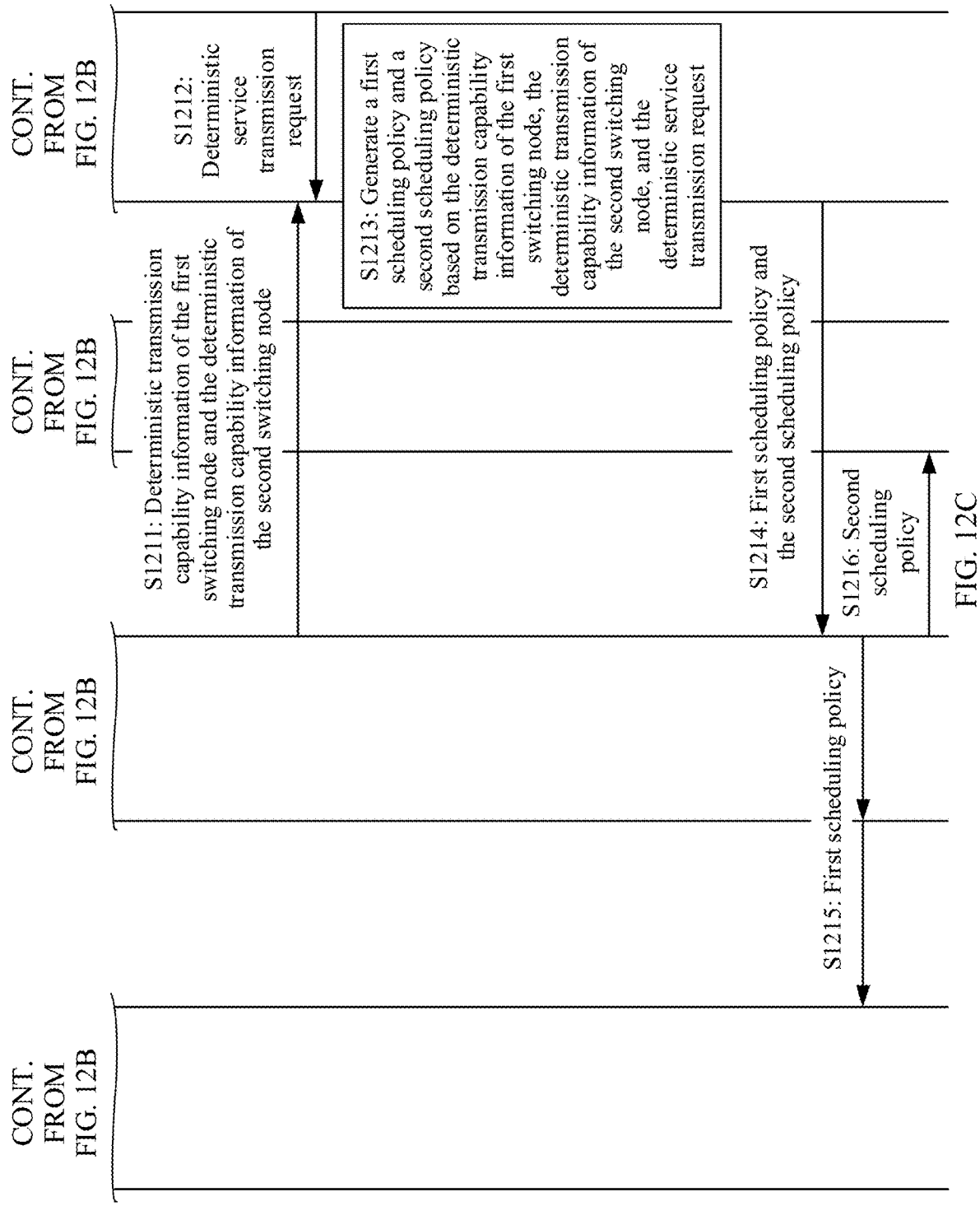

FIG. 12A, FIG. 12B, and FIG. 12C are still another schematic flowchart of a deterministic transmission method according to an embodiment of this application.

As shown in FIG. 12A, FIG. 12B, and FIG. 12C, in a possible implementation, the deterministic transmission method may include operations S1201 to S1216.

Operation S1201: A terminal sends an RRC message to a radio access network device, where the RRC message includes a PDU session establishment request, a deterministic transmission indication, and a residence time.

For example, the terminal may initiate a PDU session establishment request for a deterministic transmission service.

Correspondingly, the radio access network device receives the RRC message from the terminal.

Operation S1202: The radio access network device generates deterministic transmission capability information of a first switching node.

Operation S1203: The radio access network device sends the PDU session establishment request and the deterministic transmission indication to an AMF, and the AMF transparently transmits the PDU session establishment request and the deterministic transmission indication to an SMF.

Operation S1204: The SMF establishes a session association between the SMF and a PCF for the terminal.

The SMF may determine, based on the deterministic transmission indication, that the PDU session is used to bear the deterministic transmission service.

Operation S1205: The SMF sends an N4 session establishment request to the UPF, where the N4 session establishment request includes the deterministic transmission indication.

Operation S1206: The UPF generates deterministic transmission capability information of a second switching node.

Operation S1207: The UPF returns an N4 session establishment response to the SMF, where the N4 session establishment response includes the deterministic transmission capability information of the second switching node.

Operation S1208: The SMF sends a PDU session resource configuration request to the AMF, and the AMF transparently transmits the PDU session resource configuration request to the radio access network device.

For example, the SMF may send, to the radio access network device through the AMF, N2 information (info) used to establish the PDU session.

Operation S1209: The SMF returns a PDU session establishment accept message to the terminal.

For example, the AMF may alternatively transparently transmit the PDU session establishment accept message to the terminal, or the radio access network device may transparently transmit the PDU session establishment accept message to the terminal.

Operation S1210: The radio access network device sends a PDU session resource configuration response to the AMF, and the AMF transparently transmits the PDU session resource configuration response to the SMF, where the PDU session resource configuration response includes the deterministic transmission capability information of the first switching node.

In an embodiment, the SMF may maintain bridge information such as a bridge ID, a RAN ID, and a UPF ID for the terminal.

Operation S1211: The SMF sends the deterministic transmission capability information of the first switching node and the deterministic transmission capability information of the second switching node to a first CNC.

In an embodiment, the first CNC may maintain association information between bridges and the terminal.

Operation S1212: The first CNC receives a deterministic service transmission request from an AF.

Operation S1213: The first CNC generates a first scheduling policy and a second scheduling policy based on the deterministic transmission capability information of the first switching node, the deterministic transmission capability information of the second switching node, and the deterministic service transmission request.

Operation S1214: The first CNC sends the first scheduling policy and the second scheduling policy to the SMF.

Operation S1215: The SMF sends the first scheduling policy to the AMF, and the AMF transparently transmits the first scheduling policy to the radio access network device.

Operation S1216: The SMF sends the second scheduling policy to the UPF.

In an embodiment, after successfully sending the policies, the SMF may return a response message to the first CNC.

Figure 13A:
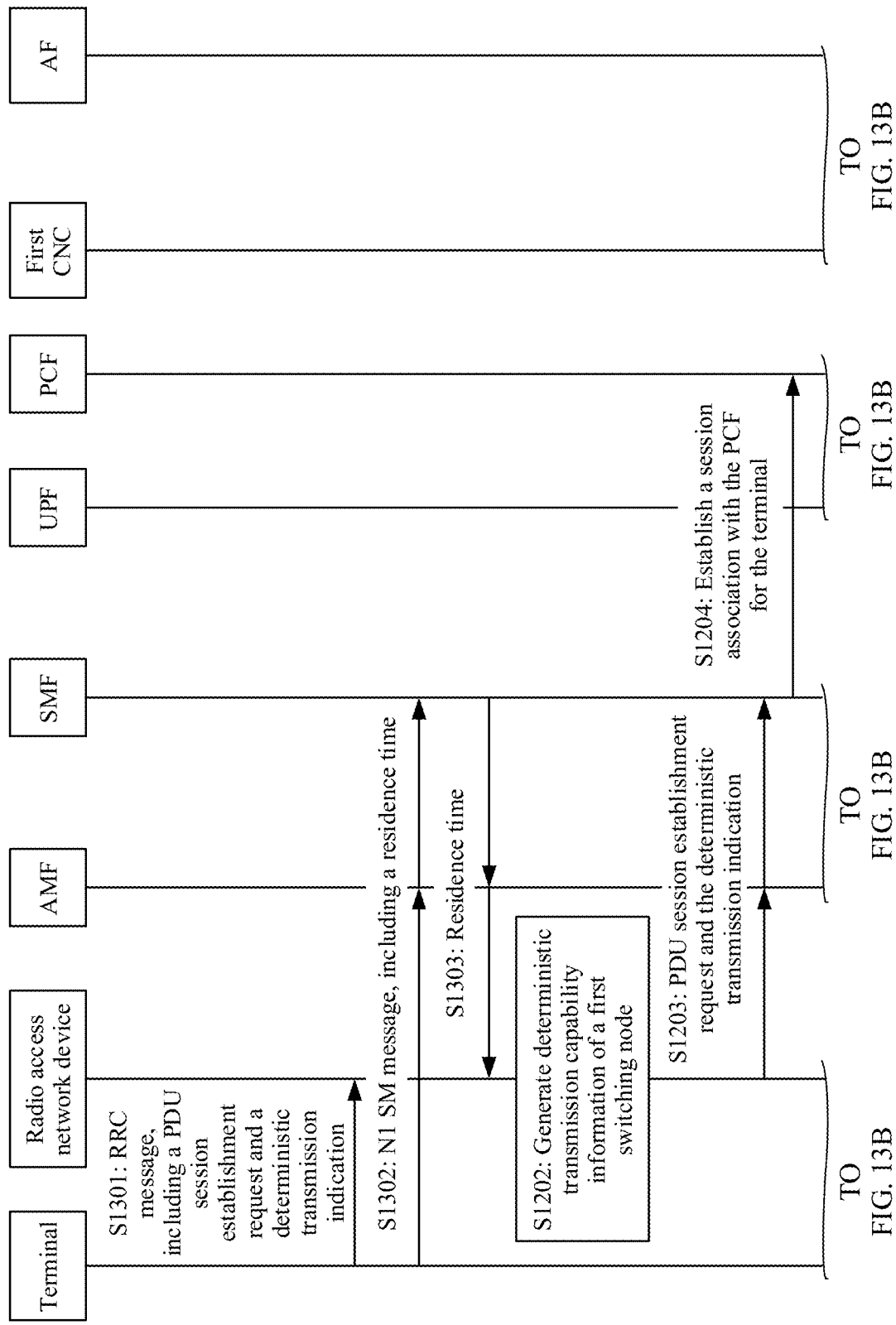
Figure 13C:
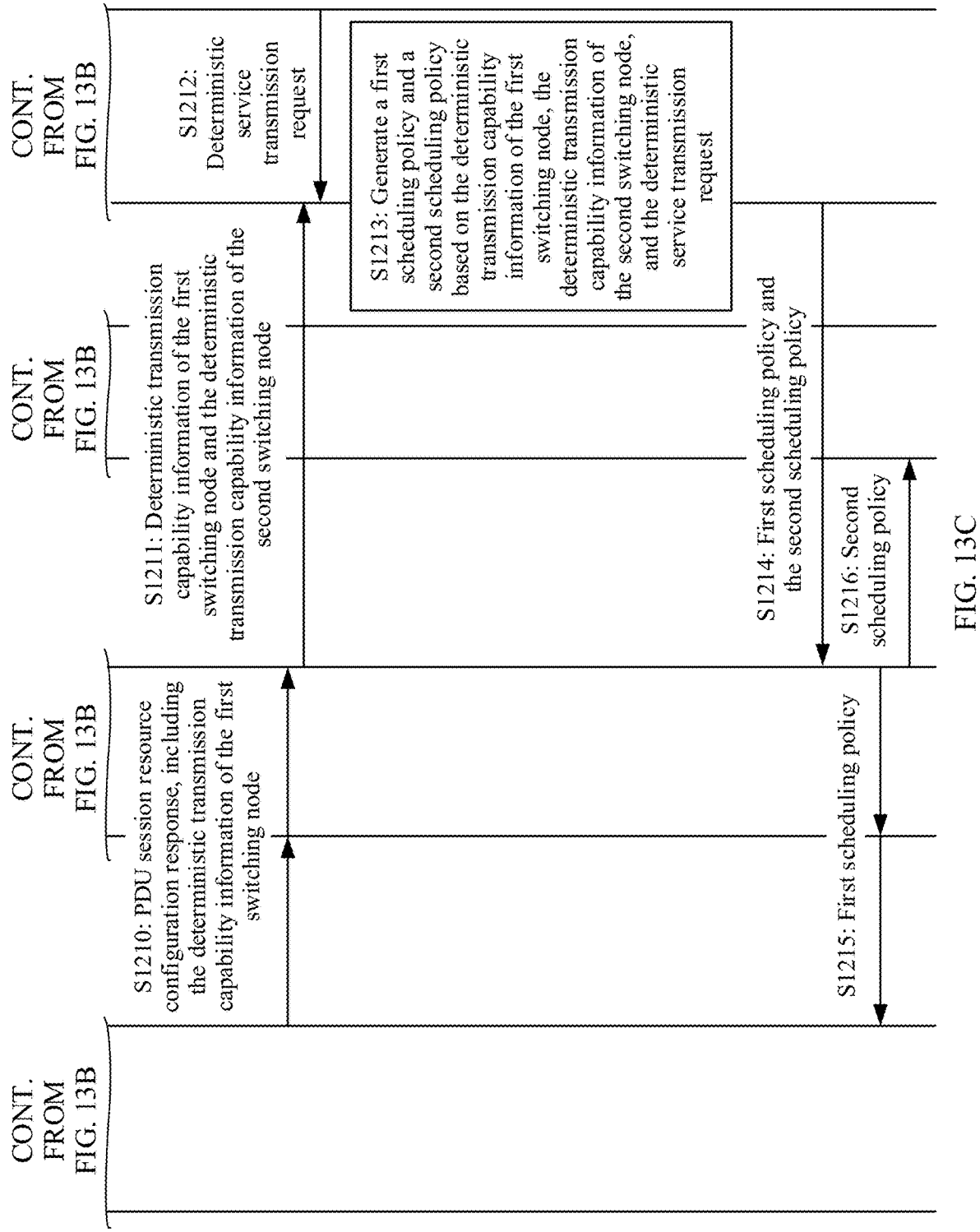

FIG. 13A, FIG. 13B, and FIG. 13C are still another schematic flowchart of a deterministic transmission method according to an embodiment of this application.

Operations S1301 to S1303 are included in FIG. 13A, FIG. 13B, and FIG. 13C. In another possible implementation, related information of the terminal, for example, a residence time, may not be sent to the radio access network device not by using an RRC message, but may be first sent by the terminal to the SMF by using an N1 SM message, and the SMF then sends the residence time to the radio access network device, so that the radio access network device generates deterministic transmission capability information of a first switching node.

Operation S1301: The terminal sends an RRC message to the radio access network device, where the RRC message includes a PDU session establishment request and a deterministic transmission indication.

Operation S1302: The terminal sends the N1 SM message to the SMF, where the N1 SM message includes the residence time.

Operation S1303: The SMF sends the residence time to the radio access network device.

Other operations after S1303 are the same as those shown in FIG. 12A, FIG. 12B, and FIG. 12C. Details are not described herein again.

Based on the foregoing embodiments, in an embodiment, when the deterministic transmission capability information of the first switching node changes, the radio access network device may send updated deterministic transmission capability information of the first switching node to the first network element; and/or when the deterministic transmission capability information of the second switching node changes, the UPF may send updated deterministic transmission capability information of the second switching node to the first network element.

For a manner in which the radio access network device sends the updated deterministic transmission capability information of the first switching node to the first network element and a manner in which the UPF sends the updated deterministic transmission capability information of the second switching node to the first network element, refer to the manner in which the radio access network device sends the deterministic transmission capability information of the first switching node to the first network element after generating the deterministic transmission capability information of the first switching node and the manner in which the UPF sends the deterministic transmission capability information of the second switching node to the first network element after generating the deterministic transmission capability information of the second switching node in the foregoing embodiments. Details are not described herein again.

After receiving the updated deterministic transmission capability information of the first switching node and/or the updated deterministic transmission capability information of the second switching node, the first network element may re-deliver an updated first scheduling policy to the radio access network device based on the updated deterministic transmission capability information of the first switching node and/or re-deliver an updated second scheduling policy to the UPF based on the updated deterministic transmission capability information of the second switching node.

For example, in the first switching node (for example, a terminal-RAN bridge), an SNR and a band change dynamically. If a decrease in the SNR can ensure deterministic transmission by increasing the band, the deterministic transmission capability information of the first switching node remains unchanged, and the radio access network device does not need to report the deterministic transmission capability information of the first switching node to the first network element. On the contrary, if a decrease in the SNR cannot ensure deterministic transmission by increasing the band, the deterministic transmission capability information of the first switching node changes, and the radio access network device needs to report the updated deterministic transmission capability information of the first switching node to the first network element.

After receiving the updated deterministic transmission capability information of the first switching node reported by the radio access network device, the first network element may adjust the first scheduling policy or the second scheduling policy for a deterministic transmission flow, for example, adjust control information of a detnet traffic flow and adjust priority information of the detnet traffic flow; or adjust control information at the second switching node (for example, a RAN-UPF bridge and/or a UPF-UPF bridge) and adjust the traffic flow to a port with better performance.

The second switching node (for example, the RAN-UPF bridge and the UPF-UPF bridge) has a stable capability, but may be affected by UPF resources and a quantity of users. When the deterministic transmission capability information of the second switching node remains unchanged, the UPF does not need to report the deterministic transmission capability information of the second switching node to the first network element. On the contrary, if the deterministic transmission capability information of the second switching node changes, the UPF needs to report the updated deterministic transmission capability information of the second switching node to the first network element.

After receiving the updated deterministic transmission capability information of the second switching node reported by the radio access network device, the first network element may adjust the first scheduling policy or the second scheduling policy for a deterministic transmission flow, for example, adjust control information of a detnet traffic flow and adjust priority information of the detnet traffic flow; or adjust control information at other second switching nodes (for example, a RAN-UPF bridge and a UPF-UPF bridge) and adjust the traffic flow to a port with better performance.

With reference to Table 1 and Table 2, the following uses an example in which the deterministic transmission capability information of the first switching node changes to further describe the process in which the first network element adjusts the first scheduling policy or the second scheduling policy for the deterministic transmission flow based on the updated deterministic transmission capability information of the first switching node.

Refer to Table 1 and Table 2. For example, it is assumed that at a first moment, the deterministic transmission delay of the terminal-RAN bridge is 20 ms corresponding to the level 2 and the priority 2, and a deterministic transmission delay of the RAN-UPF bridge is 25 ms corresponding to the Range 3 and the priority 2. In this case, a total transmission delay of the terminal-RAN bridge and the RAN-UPF bridge is 45 ms.

At a second moment (later than the first moment), if the deterministic transmission delay of the terminal-RAN bridge increases to 25 ms corresponding to the level 3 and the priority 2 due to insufficient air interface resources or poorer air interface channel quality, to ensure the total transmission delay of 45 ms, the first network element may reduce the deterministic delay of the RAN-UPF bridge. For example, the deterministic transmission delay of the RAN-UPF bridge is adjusted from the original 25 ms corresponding to the Range 3 and the priority 2 to 20 ms corresponding to the Range 2 and the priority 2. This can ensure that the total transmission delay of the terminal-RAN bridge and the RAN-UPF bridge is still 45 ms.

For another example, it is assumed that the deterministic transmission delay of the terminal-RAN bridge is 20 ms corresponding to the level 2 and the priority 2, and a deterministic transmission delay of the RAN-UPF bridge is 25 ms corresponding to the Range 3 and the priority 2. In this case, if an SNR&band of the terminal-RAN bridge changes from the level 2 to the level 3, the first network element may adjust the priority to the priority 1 for the deterministic transmission flow, to ensure that the deterministic transmission delay of the terminal-RAN bridge is 20 ms. In addition, because the priority is adjusted to the priority 1, the first network element needs to perform configuration on the RAN-UPF bridge for the deterministic transmission flow, and configures the Range 4 and the priority 1 for the RAN-UPF bridge. This ensures that the deterministic transmission delay corresponding to the RAN-UPF bridge is still 25 ms.

In the foregoing embodiments, the technical solutions provided in embodiments of this application are described by using the 5G system as the TSN network. In an embodiment, based on the foregoing embodiments, this embodiment of this application further provides a deterministic transmission method. In the method, the time-sensitive network based on the 5G system shown in FIG. 5 may serve as a bridge in a larger time-sensitive network. For example, the time-sensitive network based on the 5G system shown in FIG. 5 may be referred to as a first network or a first time-sensitive network, and the first time-sensitive network may serve as a bridge in a larger second time-sensitive network (or referred to as a second network).

Figure 14:
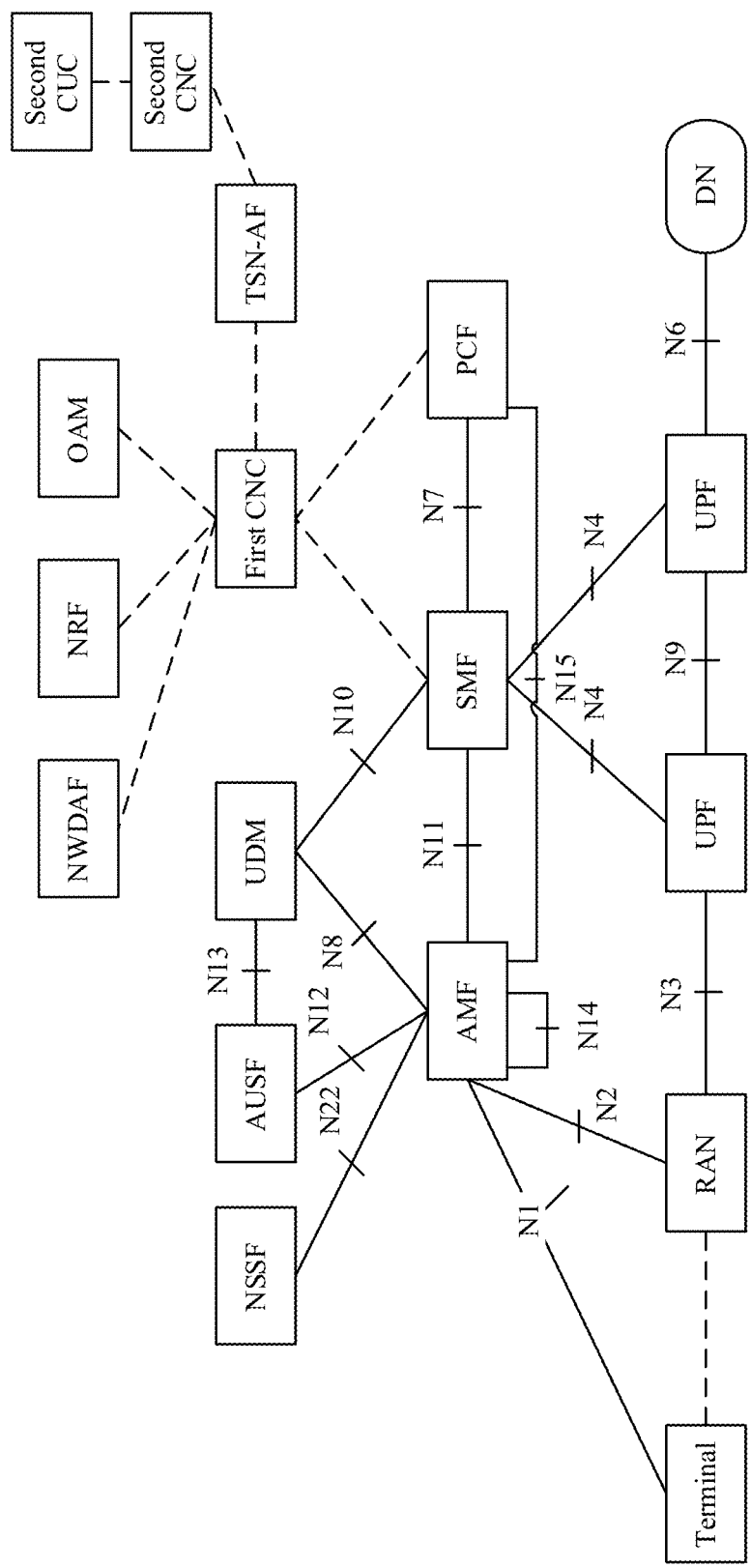
FIG. 14 is a schematic diagram of composition of a second time-sensitive network according to an embodiment of this application.

FIG. 14 is a schematic diagram of composition of a second time-sensitive network according to an embodiment of this application.

As shown in FIG. 14, the second time-sensitive network may include the time-sensitive network based on the 5G system shown in FIG. 5, namely, the first time-sensitive network, a second CUC, and a second CNC.

In an embodiment, a first CNC (e.g., the first network element in the foregoing embodiments) may generate deterministic transmission capability information of the first time-sensitive network based on the deterministic transmission capability information of the first switching node and the deterministic transmission capability information of the second switching node, and report the deterministic transmission capability information of the first time-sensitive network to the second CNC. The second CNC may generate a corresponding third scheduling policy for the first time-sensitive network based on the deterministic transmission capability information of the first time-sensitive network and with reference to deterministic transmission capability information of another bridge in the second time-sensitive network, and send the third scheduling policy to the first CNC. For specific content of the third scheduling policy, refer to the foregoing first scheduling policy and the foregoing second scheduling policy. The first CNC may generate a first scheduling policy and a second scheduling policy according to the third scheduling policy, the deterministic transmission capability information of the first switching node, and the deterministic transmission capability information of the second switching node.

Figure 15:
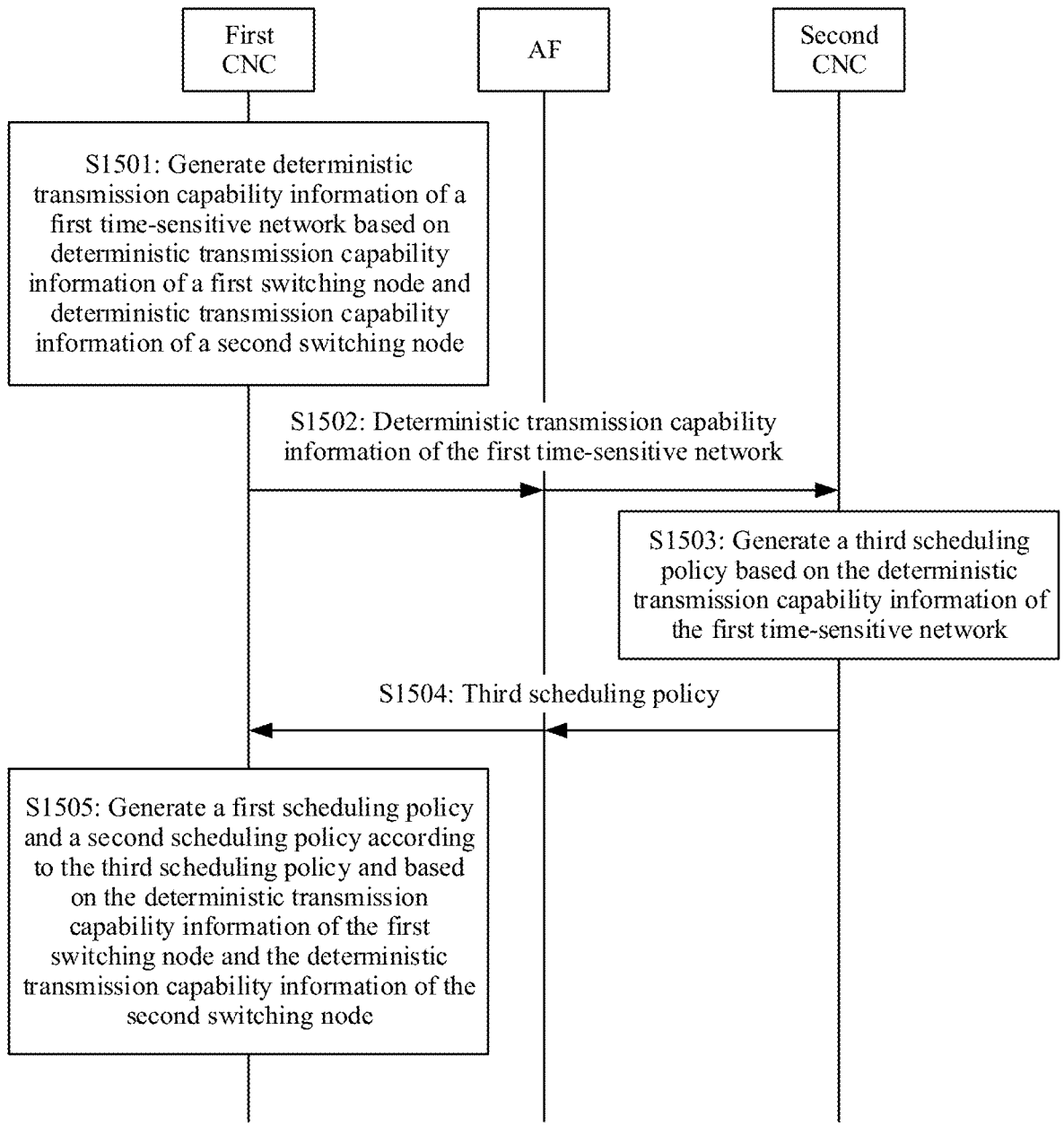
FIG. 15 is still another schematic flowchart of a deterministic transmission method according to an embodiment of this application.

For example, FIG. 15 is still another schematic flowchart of a deterministic transmission method according to an embodiment of this application.

As shown in FIG. 15, in this design, the deterministic transmission method may include operations S1501 to S1505.

Operation S1501: A first CNC generates deterministic transmission capability information of a first time-sensitive network based on deterministic transmission capability information of a first switching node and deterministic transmission capability information of a second switching node.

A manner of obtaining the deterministic transmission capability information of the first switching node and the deterministic transmission capability information of the second switching node is the same as that in the foregoing embodiments. Details are not described herein again.

Operation S1502: The first CNC sends the deterministic transmission capability information of the first time-sensitive network to a second CNC.

Operation S1503: The second CNC generates a third scheduling policy based on the deterministic transmission capability information of the first time-sensitive network.

Operation S1504: The second CNC sends the third scheduling policy to the first CNC.

Operation S1505: The first CNC generates a first scheduling policy and a second scheduling policy according to the third scheduling policy and based on the deterministic transmission capability information of the first switching node and the deterministic transmission capability information of the second switching node.

A manner of generating the first scheduling policy and the second scheduling policy based on the deterministic transmission capability information of the first switching node, the deterministic transmission capability information of the second switching node, and the third scheduling policy is the same as the manner of generating the first scheduling policy and the second scheduling policy based on the deterministic transmission capability information of the first switching node, the deterministic transmission capability information of the second switching node, and the service transmission request in the foregoing embodiments. The third scheduling policy herein can also be understood as a service transmission request of the second time-sensitive network for the bridge formed by the first time-sensitive network. Therefore, a process of determining the first scheduling policy and the second scheduling policy is not described again, either.

In this design, a 5G system may also serve as a bridge in the TSN, but a transmission path from a terminal to a UPF in the 5G system is split into a plurality of 5G internal bridges with smaller granularities or lower levels.

The foregoing mainly describes the solutions provided in embodiments of this application from a perspective of interaction between network elements. It can be understood that, to implement the foregoing functions, the network elements, such as the radio access network device, the PCF, the SMF, the UPF, and the first CNC, include corresponding hardware structures and/or software modules for performing the functions.

Figure 16:
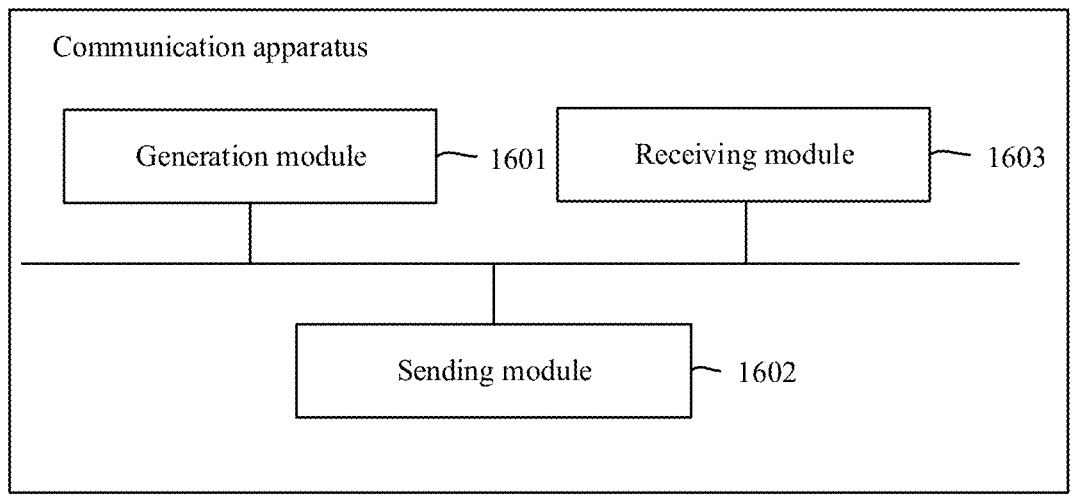
FIG. 16 is a schematic diagram of a structure of a communication apparatus according to an embodiment of this application.

For example, an embodiment of this application may further provide a communication apparatus that can be used in a radio access network device. FIG. 16 is a schematic diagram of a structure of a communication apparatus according to an embodiment of this application.

As shown in FIG. 16, the communication apparatus may include: a generation module 1601, configured to generate deterministic transmission capability information of a first switching node, where the first switching node includes a radio access network device and a terminal; a sending module 1602, configured to send the deterministic transmission capability information of the first switching node to a first network element; and a receiving module 1603, configured to receive a first scheduling policy from the first network element, where the first scheduling policy is generated by the first network element based on the deterministic transmission capability information of the first switching node.

In an embodiment, the generation module 1601 is configured to determine a first transmission delay of the first switching node based on one or more of a signal-to-noise ratio between the radio access network device and the terminal, a bandwidth allocated to a quality of service flow of the terminal, and a priority of the quality of service flow of the terminal; and determine a deterministic transmission delay of the first switching node based on the first transmission delay of the first switching node.

In an embodiment, the generation module 1601 is configured to determine a deterministic transmission delay of the first switching node based on one or more of a residence time of the terminal, a signal-to-noise ratio between the radio access network device and the terminal, a bandwidth allocated by the radio access network device to a quality of service flow of the terminal, and a priority of the quality of service flow of the terminal.

For example, the first transmission delay of the first switching node may be first determined based on the one or more of the signal-to-noise ratio between the radio access network device and the terminal, the bandwidth allocated to the quality of service flow of the terminal, and the priority of the quality of service flow of the terminal; and then the deterministic transmission delay of the first switching node may be determined based on the residence time and the first transmission delay of the first switching node.

In an embodiment, the receiving module 1603 is further configured to receive the residence time from the terminal.

In an embodiment, the receiving module 1603 is further configured to obtain the residence time of the terminal when the receiving module 1603 learns that a deterministic transmission characteristic of the terminal is authorized to be activated in a process in which the terminal is switched from an idle mode to a connected mode.

In an embodiment, a correspondence between a first transmission delay, a signal-to-noise ratio, a bandwidth, and a data priority used for deterministic transmission is configured on the radio access network device. The generation module 1601 is configured to: determine the first transmission delay of the first switching node based on the correspondence between a first transmission delay, a signal-to-noise ratio, a bandwidth, and a data priority used for deterministic transmission, and based on the one or more of the signal-to-noise ratio between the radio access network device and the terminal, the bandwidth allocated by the radio access network device to the quality of service flow of the terminal, and the priority of the quality of service flow of the terminal; and determine the deterministic transmission delay of the first switching node based on the residence time of the terminal and the first transmission delay of the first switching node.

In an embodiment, the receiving module 1603 is further configured to receive a deterministic transmission indication from the terminal.

In an embodiment, the receiving module 1603 is configured to receive an RRC message from the terminal, where the RRC message includes the deterministic transmission indication.

In an embodiment, the sending module 1602 is further configured to send the deterministic transmission indication to an SMF.

In an embodiment, the receiving module 1603 is configured to receive the deterministic transmission indication from an SMF, where the deterministic transmission indication is sent by the terminal to the SMF.

In an embodiment, the sending module 1602 is further configured to send updated deterministic transmission capability information of the first switching node to the first network element.

In an embodiment, the first network element is a first CNC, a PCF, an NEF, an SMF.

Figure 17:
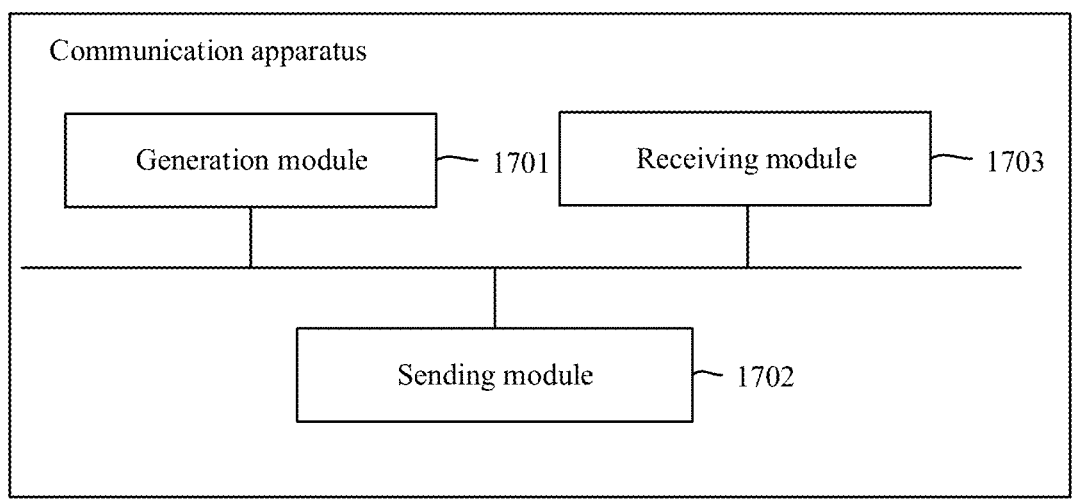
FIG. 17 is another schematic diagram of a structure of a communication apparatus according to an embodiment of this application.

An embodiment of this application may further provide a communication apparatus that can be used in a UPF. FIG. 17 is another schematic diagram of a structure of a communication apparatus according to an embodiment of this application.

As shown in FIG. 17, the communication apparatus may include: a generation module 1701, configured to generate deterministic transmission capability information of a second switching node, where the second switching node includes the UPF; a sending module 1702, configured to send the deterministic transmission capability information of the second switching node to a first network element; and a receiving module 1703, configured to receive a second scheduling policy from the first network element, where the second scheduling policy is generated by the first network element based on the deterministic transmission capability information of the second switching node.

In an embodiment, the generation module 1701 is configured to: determine an egress port and a priority of the egress port; and determine a second transmission delay of the second node based on the egress port, the priority of the egress port, and a correspondence between a second transmission delay, an egress port, and a priority of the egress port, and use the second transmission delay as a deterministic transmission delay of the second switching node.

In an embodiment, the receiving module 1703 is further configured to receive a deterministic transmission indication from an SMF.

In an embodiment, the sending module 1702 is further configured to send updated deterministic transmission capability information of the second switching node to the first network element.

In an embodiment, the first network element is any one of the following network elements: a first CNC, a PCF, an NEF, and the SMF.

Figure 18:
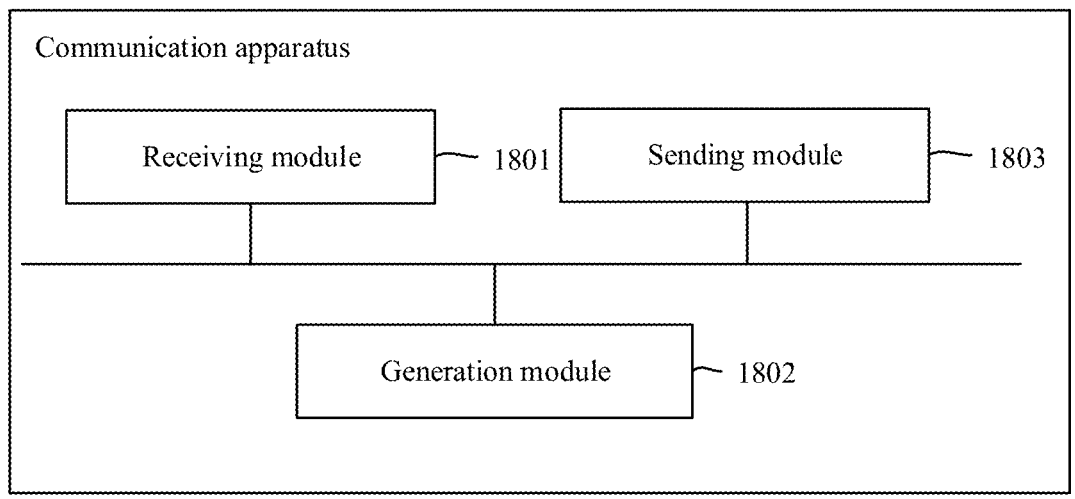
FIG. 18 is still another schematic diagram of a structure of a communication apparatus according to an embodiment of this application.

An embodiment of this application may further provide a communication apparatus that can be used in a first network element. FIG. 18 is still another schematic diagram of a structure of a communication apparatus according to an embodiment of this application.

As shown in FIG. 18, the communication apparatus may include: a receiving module 1801, configured to receive deterministic transmission capability information of a first switching node from a radio access network device and deterministic transmission capability information of a second switching node from a UPF, where the first switching node includes the radio access network device and a terminal, and the second switching node includes the UPF; a generation module 1802, configured to generate a first scheduling policy and a second scheduling policy based on the deterministic transmission capability information of the first switching node and the deterministic transmission capability information of the second switching node; and a sending module 1803, configured to send the first scheduling policy to the radio access network device, and send the second scheduling policy to the UPF.

In an embodiment, the receiving module 1801 is further configured to receive a deterministic service transmission request from a second network element; and the generation module 1802 is configured to generate the first scheduling policy and the second scheduling policy based on the deterministic transmission capability information of the first switching node, the deterministic transmission capability information of the second switching node, and the deterministic service transmission request.

In an embodiment, the receiving module 1801 is further configured to receive updated deterministic transmission capability information of the first switching node from the radio access network device and/or updated deterministic transmission capability information of the second switching node from the UPF.

In an embodiment, the apparatus is used in any one of the following network elements: a first CNC, a PCF, an NEF, and an SMF.

In an embodiment, when the apparatus is used in the SMF, the receiving module 1801 is further configured to receive a deterministic transmission indication from the terminal.

In an embodiment, the sending module 1803 is further configured to send the deterministic transmission indication to the radio access network device.

In an embodiment, when the apparatus is used in the SMF, the receiving module 1801 is further configured to receive a deterministic transmission indication from the radio access network device.

In an embodiment, the sending module 1803 is further configured to send the deterministic transmission indication to the UPF.

In still another embodiment, the receiving module 1801 is configured to receive the deterministic transmission capability information of the first switching node and the deterministic transmission capability information of the second switching node from the SMF, where the deterministic transmission capability information of the first switching node is sent by the radio access network device to the SMF, and the deterministic transmission capability information of the second switching node is sent by the UPF to the SMF; and the sending module 1803 is configured to send the first scheduling policy to the radio access network device through the SMF, and send the second scheduling policy to the UPF through the SMF.

In an embodiment, the second network element is a first centralized user configuration CUC or an application function AF.

In an embodiment, the receiving module 1801 is further configured to receive a third scheduling policy from a second CNC; and the generation module 1802 is configured to generate the first scheduling policy and the second scheduling policy according to the third scheduling policy, the deterministic transmission capability information of the first switching node, and the deterministic transmission capability information of the second switching node.

In an embodiment, the generation module 1802 is further configured to generate deterministic transmission capability information of a first network based on the deterministic transmission capability information of the first switching node and the deterministic transmission capability information of the second switching node; and the sending module 1803 is further configured to send the deterministic transmission capability information of the first network to the second CNC.

Figure 19:
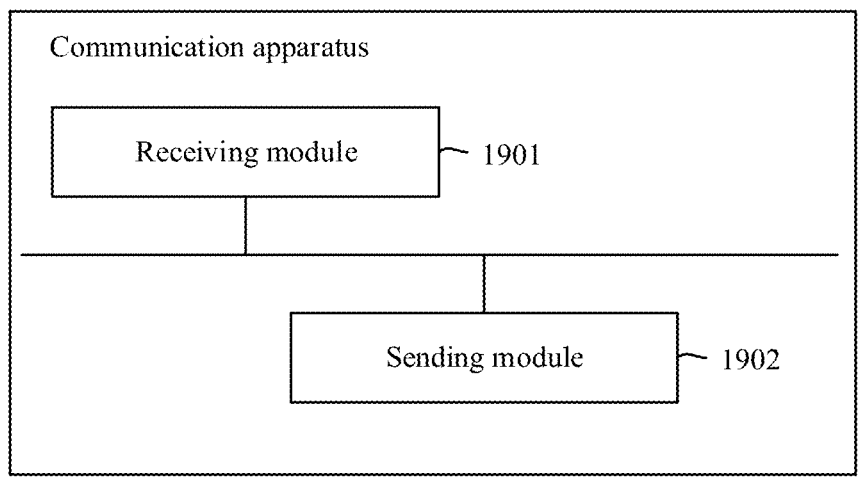
FIG. 19 is still another schematic diagram of a structure of a communication apparatus according to an embodiment of this application.

An embodiment of this application may further provide a communication apparatus that can be used in an SMF. FIG. 19 is still another schematic diagram of a structure of a communication apparatus according to an embodiment of this application.

As shown in FIG. 19, the communication apparatus may include: a receiving module 1901, configured to receive deterministic transmission capability information of a first switching node from a radio access network device and deterministic transmission capability information of a second switching node from a UPF, where the first switching node includes the radio access network device and a terminal, and the second switching node includes the UPF; and a sending module 1902, configured to send the deterministic transmission capability information of the first switching node and the deterministic transmission capability information of the second switching node to a first network element; where the receiving module 1901 is further configured to receive a first scheduling policy and a second scheduling policy from the first network element, and the sending module 1902 is further configured to send the first scheduling policy to the radio access network device, and send the second scheduling policy to the UPF.

In an embodiment, the receiving module 1901 is further configured to receive updated deterministic transmission capability information of the first switching node from the radio access network device and/or updated deterministic transmission capability information of the second switching node from the UPF; and the sending module 1902 is further configured to send the updated deterministic transmission capability information of the first switching node and/or the updated deterministic transmission capability information of the second switching node to the first network element.

In an embodiment, the receiving module 1901 is further configured to receive a deterministic transmission indication from the terminal; and the sending module 1902 is further configured to send the deterministic transmission indication to the radio access network device and the UPF.

In an embodiment, the receiving module 1901 is further configured to receive a deterministic transmission indication from the radio access network device, where the deterministic transmission indication is sent by the terminal to the radio access network device; and the sending module 1902 is further configured to send the deterministic transmission indication to the UPF.

Figure 20:
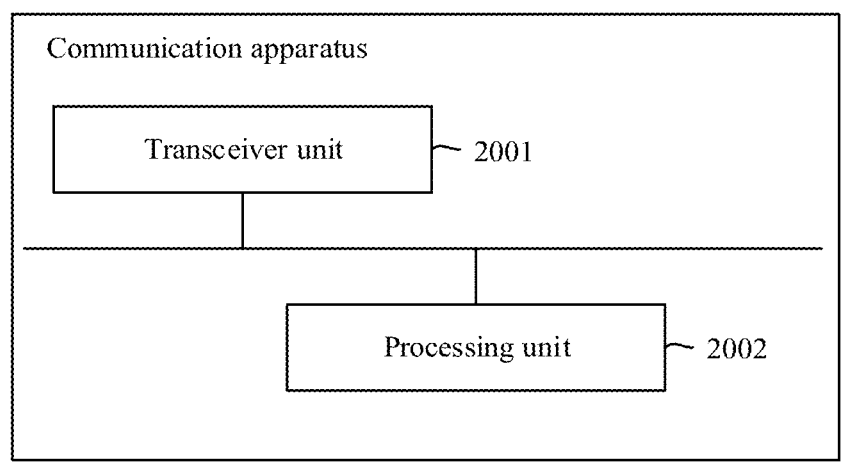
FIG. 20 is still another schematic diagram of a structure of a communication apparatus according to an embodiment of this application.

Optionally, an embodiment of this application further provides a communication apparatus. The communication apparatus can be used in any one of the foregoing core-network network elements (or devices) such as the radio access network device, the UPF, the SMF, and the first network element. FIG. 20 is still another schematic diagram of a structure of a communication apparatus according to an embodiment of this application.

As shown in FIG. 20, the communication apparatus may include a transceiver unit 2001 and a processing unit 2002. The transceiver unit 2001 may be configured to send and receive information, or may be configured to communicate with another network element. The processing unit 2002 may be configured to process data.

When the communication apparatus is used in the radio access network device, the method performed by the radio access network device in the foregoing embodiments may be implemented by using the transceiver unit 2001 and the processing unit 2002.

When the communication apparatus is used in the UPF, the method performed by the UPF in the foregoing embodiments may be implemented by using the transceiver unit 2001 and the processing unit 2002.

When the communication apparatus is used in the first network element, the method performed by the first network element in the foregoing embodiments may be implemented by using the transceiver unit 2001 and the processing unit 2002. When the first network element is the SMF, the method performed by the SMF in the foregoing embodiments may be implemented by using the transceiver unit 2001 and the processing unit 2002.

It should be understood that module or unit division of the apparatuses is merely logical function division. During actual implementation, all or some of the modules or units may be integrated into one physical entity, or may be physically separated. In addition, all of the units in the apparatuses may be implemented by a processing element invoking software; or all of the units may be implemented by hardware; or some of the units may be implemented by a processing element invoking software, and some of the units may be implemented by hardware.

For example, each unit may be an independently disposed processing element; or may be integrated into a chip of the apparatus. Alternatively, each unit may be stored in a memory in a form of a program, and a function of the unit is invoked and performed by a processing element of the apparatus. Moreover, all or some of the units may be integrated together, or may be independently implemented. The processing element herein may also be referred to as a processor, and may be an integrated circuit with a signal processing capability. In an implementation process, the operations of the foregoing method or the foregoing units may be implemented by an integrated logic circuit of hardware in the processor element, or may be implemented by a processing element invoking software.

In an example, the units in any one of the foregoing apparatuses may be one or more integrated circuits configured to implement the foregoing methods, for example, one or more ASICs, one or more DSPs, one or more FPGAs, or a combination of at least two forms of these integrated circuits.

For another example, when the units in the apparatuses may be implemented by a processing element scheduling a program, the processing element may be a general purpose processor, for example, a CPU or another processor that can invoke a program. For another example, the units may be integrated together and implemented in a form of a system-on-a-chip (SOC).

The foregoing receiving unit is an interface circuit or an input circuit of the apparatus, and is configured to receiving a signal from another apparatus. For example, when the apparatus is implemented by using a chip, the receiving unit is an interface circuit or an input circuit for the chip to receive a signal from another chip or apparatus. When the communication apparatus includes a sending unit, the sending unit is an interface circuit or an output circuit of the apparatus, and is configured to send a signal to another apparatus. For example, when the apparatus is implemented by using a chip, the sending unit is an interface circuit or an output circuit for the chip to send a signal to another chip or apparatus.

For example, an embodiment of this application may further provide a communication apparatus. The communication apparatus can be used in any one of the foregoing core-network network elements such as the radio access network device, the UPF, the SMF, and the first network element. The communication apparatus may include a processor and an interface circuit. There may be one or more processors.

When the communication apparatus is used in the radio access network device, the processor is configured to communicate with another apparatus by using the interface circuit, and performs operations performed by the radio access network device in the foregoing methods.

When the communication apparatus is used in the UPF, the processor is configured to communicate with another apparatus by using the interface circuit, and performs operations performed by the UPF in the foregoing methods.

When the communication apparatus is used in the first network element (or the SMF), the processor is configured to communicate with another apparatus by using the interface circuit, and performs operations performed by the first network element (or the SMF) in the foregoing methods.

In an implementation, units that are in the core-network network elements such as the radio access network device, the UPF, the SMF, and the first network element and that respectively implement corresponding operations in the foregoing methods may be implemented by a processing element scheduling a program. For example, the apparatus used for the core-network network elements such as the radio access network device, the UPF, the SMF, and the first network element may include a processing element and a storage element. The processing element invokes a program stored in the storage element, to perform corresponding methods in the foregoing method embodiments performed by the core-network network elements such as the radio access network device, the UPF, the SMF, and the first network element. The storage element may be a storage element on a same chip as the processing element, namely, an on-chip storage element.

In another embodiment, a program used for performing the methods performed by the core-network network elements such as the radio access network device, the UPF, the SMF, and the first network element in the foregoing methods may be on a storage element on a different chip from the processing element, namely, an off-chip storage element. In this case, the processing element invokes the program from the off-chip storage element and loads the program on an on-chip storage element, to invoke and perform corresponding methods in the foregoing method embodiments performed by the core-network network elements such as the radio access network device, the UPF, the SMF, and the first network element.

For example, an embodiment of this application may further provide a communication apparatus. The communication apparatus may include a processor, configured to execute computer instructions stored in a memory. When the computer instructions are executed, the apparatus is enabled to perform the methods performed by the core-network network elements such as the radio access network device, the UPF, the SMF, and the first network element. The memory may be located inside or outside the communication apparatus. There are one or more processors.

In still another embodiment, units that are in the core-network network elements such as the radio access network device, the UPF, the SMF, and the first network element and that implement operations in the foregoing methods may be configured as one or more processing elements. The processing elements may be disposed on core network devices corresponding to the core-network network elements such as the radio access network device, the UPF, the SMF, and the first network element. The processing element herein may be an integrated circuit, for example, one or more ASICs, one or more DSPs, one or more FPGAs, or a combination of these integrated circuits. The integrated circuits may be integrated together to form a chip.

The units that are in the core-network network elements such as the radio access network device, the UPF, the SMF, and the first network element and that implement operations in the foregoing methods may be integrated together, and are implemented in a form of an SOC. The SOC chip is configured to implement a corresponding method. At least one processing element and storage element may be integrated into the chip, and the processing element invokes a program stored in the storage element, to implement a corresponding method. Alternatively, at least one integrated circuit may be integrated into the chip, to implement a corresponding method. Alternatively, with reference to the foregoing implementations, functions of a part of units may be implemented by invoking a program by the processing element, and functions of a part of units may be implemented by the integrated circuit.

As described above, the processing element herein may be a general purpose processor, for example, a CPU, or may be one or more integrated circuits configured to implement the foregoing methods, for example, one or more ASICs, one or more microprocessors DSPs, one or more FPGAs, or a combination of at least two forms of these integrated circuits.

The storage element may be one memory, or may be a generic term of a plurality of storage elements.

For example, an embodiment of this application further provides a chip system. The chip system can be applied to any one of core network devices corresponding to the foregoing core-network network elements such as the radio access network device, the UPF, the SMF, and the first network element. The chip system includes one or more interface circuits and one or more processors. The interface circuit and the processor are interconnected through a line. The processor receives computer instructions from a memory of an electronic device through the interface circuit and executes the computer instructions, to implement corresponding methods in the foregoing method embodiments performed by the core-network network elements such as the radio access network device, the UPF, the SMF, and the first network element.

Based on the foregoing descriptions of the implementations, a person skilled in the art can clearly understand that for the purpose of convenient and brief descriptions, functional module division is merely used as an example for description. During actual application, the foregoing functions can be allocated to different functional modules for implementation depending on a requirement. In other words, an inner structure of an apparatus is divided into different functional modules to implement all or a part of the functions described above.

In the several embodiments provided in this application, it should be understood that the disclosed apparatuses and methods may be implemented in other manners. For example, the described apparatus embodiments are merely examples. For example, module or unit division is merely logical function division, and may be other division during actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may be one or more physical units. To be specific, the parts may be located in one place, or may be distributed in a plurality of different places. Some or a part of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be embodied in a form of a software product, for example, a program. The software product is stored in a program product, for example, a computer-readable storage medium, and includes several instructions for instructing a device (which may be a single-chip microcomputer, a chip, or the like) or a processor (processor) to perform all or some of the operations of the methods described in embodiments of this application. The foregoing storage medium includes any medium that can store program code, such as a USB flash drive, a removable hard disk, a ROM, a RAM, a magnetic disk, or an optical disc.

For example, an embodiment of this application may further provide a computer-readable storage medium, including computer software instructions. When the computer software instructions are run in a radio access network device or a chip built in a radio access network device, the radio access network device is enabled to perform the methods performed by the radio access network device in the foregoing embodiments.

Alternatively, when the computer software instructions are run in core network devices corresponding to the core-network network elements such as the UPF, the SMF, and the first network element, or are run in chips built in the core network devices, the core network devices are enabled to perform the methods performed by the core-network network elements such as the UPF, the SMF, and the first network element in the foregoing embodiments.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A deterministic transmission method, comprising:
generating, by a radio access network device, deterministic transmission capability information of a first switching node that comprises the radio access network device and a terminal, the generating further comprising:
obtaining, by the radio access network device, a residence time of the terminal when the radio access network device determines that a deterministic transmission characteristic of the terminal is authorized to be activated in a process in which the terminal is switched from an idle mode to a connected mode; and
determining a deterministic transmission delay of the first switching node based on at least one of the residence time of the terminal, a signal-to-noise ratio between the radio access network device and the terminal, a bandwidth allocated by the radio access network device to a quality of service flow of the terminal, or a priority of the quality of service flow of the terminal;
sending, by the radio access network device, the deterministic transmission capability information of the first switching node to a first network element; and
receiving, by the radio access network device, a first scheduling policy from the first network element, wherein the first scheduling policy is generated by the first network element based on the deterministic transmission capability information of the first switching node.

2. The method according to claim 1, wherein before determining the deterministic transmission delay of the first switching node, the method further comprises:
receiving, by the radio access network device, the residence time from the terminal.

3. The method according to claim 1, wherein determining the deterministic transmission delay of the first switching node comprises:
determining, by the radio access network device, a first transmission delay of the first switching node based on one or more of the signal-to-noise ratio between the radio access network device and the terminal, the bandwidth allocated to the quality of service flow of the terminal, or the priority of the quality of service flow of the terminal, and based on a correspondence between the first transmission delay, the signal-to-noise ratio, the bandwidth, and a data priority used for deterministic transmission; and
determining, by the radio access network device, the deterministic transmission delay of the first switching node based on the residence time of the terminal and the first transmission delay of the first switching node.

4. The method according to claim 1, wherein before generating the deterministic transmission capability information of the first switching node, the method further comprises:
receiving, by the radio access network device, a deterministic transmission indication from the terminal.

5. The method according to claim 4, wherein receiving the deterministic transmission indication from the terminal comprises:
receiving, by the radio access network device, a radio resource control (RRC) message from the terminal, wherein the RRC message comprises the deterministic transmission indication.

6. The method according to claim 4, further comprising:
sending, by the radio access network device, the deterministic transmission indication to a session management function (SMF).

7. The method according to claim 4, wherein receiving the deterministic transmission indication from the terminal comprises:
receiving, by the radio access network device, the deterministic transmission indication from an SMF, wherein the deterministic transmission indication is sent by the terminal to the SMF.

8. The method according to claim 1, further comprising:
sending, by the radio access network device, updated deterministic transmission capability information of the first switching node to the first network element.

9. The method according to claim 1, wherein the first network element is a first centralized network configuration (CNC), a policy control function (PCF), a network exposure function (NEF), or an SMF.

10. A deterministic transmission method, comprising:
generating, by a user plane function (UPF), deterministic transmission capability information of a second switching node comprising the UPF;
sending, by the UPF, the deterministic transmission capability information of the second switching node to a first network element; and
receiving, by the UPF, a second scheduling policy from the first network element, wherein the second scheduling policy is generated by the first network element based on the deterministic transmission capability information of the second switching node.

11. The method according to claim 10, wherein generating the deterministic transmission capability information of the second switching node comprises:
determining, by the UPF, an egress port and a priority of the egress port; and
determining, by the UPF, a second transmission delay of the second switching node based on the egress port, the priority of the egress port, and a correspondence between the second transmission delay, the egress port, and the priority of the egress port, wherein the second transmission delay is used as a deterministic transmission delay of the second switching node.

12. The method according to claim 10, wherein before generating the deterministic transmission capability information of the second switching node, the method further comprises:
receiving, by the UPF, a deterministic transmission indication from an SMF.

13. The method according to claim 10, further comprising:
sending, by the UPF, updated deterministic transmission capability information of the second switching node to the first network element.

14. A deterministic transmission method, comprising:
receiving, by a first network element, deterministic transmission capability information of a first switching node from a radio access network device and deterministic transmission capability information of a second switching node from a user plane function (UPF), wherein the first switching node comprises the radio access network device and a terminal, and the second switching node comprises the UPF;
generating, by the first network element, a first scheduling policy and a second scheduling policy based on the deterministic transmission capability information of the first switching node and the deterministic transmission capability information of the second switching node; and
sending, by the first network element, the first scheduling policy to the radio access network device, and sending, by the first network element, the second scheduling policy to the UPF.

15. The method according to claim 14, wherein before generating the first scheduling policy and the second scheduling policy, the method further comprises:
receiving, by the first network element, a deterministic service transmission request from a second network element; and
wherein generating the first scheduling policy and the second scheduling policy comprises:
generating, by the first network element, the first scheduling policy and the second scheduling policy based on the deterministic transmission capability information of the first switching node, the deterministic transmission capability information of the second switching node, and the deterministic service transmission request.

16. The method according to claim 14, further comprising:
receiving, by the first network element, updated deterministic transmission capability information of the first switching node from the radio access network device, and/or updated deterministic transmission capability information of the second switching node from the UPF.

17. The method according to claim 14, wherein the first network element is a first CNC, a PCF, an NEF, or an SMF.

18. The method according to claim 17, wherein when the first network element is the SMF, the method further comprises:

receiving, by the first network element, a deterministic transmission indication from the terminal.

\* \* \* \* \*